US012215012B2

(12) United States Patent
Koide et al.

(10) Patent No.: US 12,215,012 B2
(45) Date of Patent: Feb. 4, 2025

(54) FORKLIFT AND CONTROL METHOD FOR FORKLIFT

(71) Applicant: KABUSHIKI KAISHA TOYOTA JIDOSHOKKI, Kariya (JP)

(72) Inventors: Yukikazu Koide, Tsukuba (JP); Norihiko Kato, Tsukuba (JP); Daisuke Okabe, Tsukuba (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 320 days.

(21) Appl. No.: 17/961,783

(22) Filed: Oct. 7, 2022

(65) Prior Publication Data

US 2023/0110512 A1 Apr. 13, 2023

(30) Foreign Application Priority Data

Oct. 12, 2021 (JP) ................................ 2021-167390

(51) Int. Cl.
*B66F 9/075* (2006.01)

(52) U.S. Cl.
CPC .................................. *B66F 9/0755* (2013.01)

(58) Field of Classification Search
CPC ................................. B66F 9/0755; B66F 9/10
USPC ........................................................... 700/253
See application file for complete search history.

(56) References Cited

U.S. PATENT DOCUMENTS

2016/0101970 A1* 4/2016 Taki ...................... B66F 17/003 701/50
2017/0285644 A1* 10/2017 Ichinose ................ B66F 9/063
2018/0105406 A1* 4/2018 Goto ..................... B66F 9/0755

FOREIGN PATENT DOCUMENTS

JP 2001278593 A * 10/2001
JP 2005008367 A * 1/2005
JP 2017019595 A * 1/2017
JP 2018058679 A * 4/2018
JP 2021160885 A * 10/2021
JP 2022029275 A * 2/2022
JP 2023048442 A * 4/2023

OTHER PUBLICATIONS

Hayakawa Makoto (JP2005008367 A); Fork Posture Control Device for Forklift Truck, and ForkliftTruck; Toyota IND Corp. (Year: 2005).*

* cited by examiner

*Primary Examiner* — B M M Hannan
(74) *Attorney, Agent, or Firm* — Sughrue Mion, PLLC

(57) ABSTRACT

A forklift includes a vehicle body, a fork that mounts a pallet, and a sensor provided in an insertion portion of the fork. The forklift inserts the insertion portion into an insertion opening, while moving the fork. When the sensor detects a proximity state, in which the insertion portion has approached a facing surface to such an extent that a distance between the insertion portion and the facing surface is less than or equal to a specified value, the forklift executes a stopping process that stops movement of the fork. The forklift executes an avoidance process that tilts and vertically moves, after the stopping process, the fork to separate the insertion portion away from the facing surface such that a position of the insertion portion with respect to an entrance of the insertion opening does not change in an up-down direction of the vehicle body.

6 Claims, 8 Drawing Sheets

FORKLIFT AND CONTROL METHOD FOR FORKLIFT

BACKGROUND

1. Field

The present disclosure relates to a forklift and a control method for a forklift.

2. Description of Related Art

Japanese Laid-Open Patent Publication No. 2005-008367 discloses a forklift.

The forklift includes a vehicle body, forks, a tilt device, a lift device, and a moving device. The forklift includes a first sensor, a second sensor, a third sensor, a fourth sensor, and a controller. A pallet is mounted on the forks. The forks are inserted into an insertion opening of the pallet. Surfaces that define the insertion opening include facing surfaces, which face the forks in the thickness direction of the forks. The facing surfaces include an upper inner surface and a lower inner surface.

The tilt device includes a tilt cylinder, a cargo handling motor, an electromagnetic valve, and a cargo handling pump. The tilt device tilts the forks in the front-rear direction of the vehicle body. The lift device includes, a lift cylinder, the cargo handling motor, the electromagnetic valve, and the cargo handling pump. The lift device vertically moves the forks in the up-down direction of the vehicle body. The moving device includes a reach cylinder, the cargo handling motor, the electromagnetic valve, and the cargo handling pump. The moving device moves the forks in the front-rear direction of the vehicle body.

The first sensor and the second sensor are provided at the distal end of a fork. The first sensor is switched ON from the OFF state when the distance between the distal end of the fork and the upper inner surface is less than or equal to a specified value. The second sensor is switched ON from the OFF state when the distance between the distal end of the fork and the lower inner surface is less than or equal to a specified value. The third sensor and the fourth sensor are provided at the proximal end of the fork. The third sensor is switched ON from the OFF state when a cargo is placed on the proximal end of the fork. The fourth sensor is switched ON from the OFF state when the distance between the proximal end of the fork and the lower inner surface is less than or equal to a specified value.

The controller executes a fork insertion control for inserting the forks into the insertion opening based on respective detection results of the first sensor, the second sensor, the third sensor, and the fourth sensor. The fork insertion control includes an avoidance process. The avoidance process is executed by the controller when one of the first sensor and the second sensor is ON, and both of the third sensor and the fourth sensor are OFF. In the avoidance process, the controller controls the lift device to lift or lower the forks. When being lifted or lowered, the forks separate from a facing surface of the insertion opening.

When the first sensor, the second sensor, the third sensor, and the fourth sensor are all OFF, the controller stops lifting or lowering the forks. When the first sensor and the fourth sensor are ON, and the second sensor and the third sensor are OFF, the controller stops lowering the forks. When the first sensor and the fourth sensor are OFF, and the second sensor and the third sensor are ON, the controller stops lifting the forks. That is, the avoidance process is executed or stopped based on the detection results of the first sensor, the second sensor, the third sensor, and the fourth sensor.

For example, it is assumed that the first sensor and the second sensor are inside the insertion opening, and the third sensor and the fourth sensor are outside the insertion opening. In this case, the avoidance process is executed when one of the first sensor and the second sensor is switched ON, and stopped when the first sensor and the second sensor are switched OFF.

The forks may contact a facing surface of the insertion opening before the avoidance process is stopped due to the first sensor and the second sensor being switched OFF. This hinders proper insertion of the forks into the insertion opening, and the pallet may fail to be properly mounted on the forks.

SUMMARY

In a general aspect, a forklift is provided that includes a vehicle body, a fork, a moving device, a lift device, a tilt device, a sensor, and processing circuitry. The fork is configured to mount a pallet. An opening into which the fork is inserted when the pallet is mounted on the fork is an insertion opening. The fork includes an insertion portion that is inserted into the insertion opening. A surface that defines the insertion opening includes a facing surface that faces the insertion portion in a thickness direction of the insertion portion. The moving device is configured to move the fork in a first direction. The first direction is a front-rear direction of the vehicle body. The lift device is configured to lift or lower the fork in a second direction. The second direction is orthogonal to the first direction and is an up-down direction of the vehicle body. The tilt device is configured to tilt the fork with respect to the first direction. The sensor is provided in the insertion portion and is configured to detect a proximity state, in which the insertion portion has approached the facing surface to such an extent that a distance between the insertion portion and the facing surface is less than or equal to a specified value. The processing circuitry is configured to control the moving device, the lift device, and the tilt device. The processing circuitry is configured to execute: a stopping process that stops the moving device, the lift device, and the tilt device when the sensor detects the proximity state; and an avoidance process that controls, after the stopping process, the tilt device and the lift device to separate the insertion portion away from the facing surface such that a position in the second direction of the insertion portion with respect to an entrance of the insertion opening does not change.

In another general aspect, a control method for a forklift is provided. The forklift includes a vehicle body and a fork configured to mount a pallet. An opening into which the fork is inserted when the pallet is mounted on the fork is an insertion opening. The fork includes an insertion portion that is inserted into the insertion opening. A surface that defines the insertion opening includes a facing surface that faces the insertion portion in a thickness direction of the insertion portion. The control method comprises: inserting the insertion portion into the insertion opening, while moving the fork; using a sensor that is provided in the insertion portion to detect a proximity state, in which the insertion portion has approached the facing surface to such an extent that a distance between the insertion portion and the facing surface is less than or equal to a specified value; executing a stopping process that stops movement of the fork when the sensor detects the proximity state; and executing an avoidance process that tilts and vertically moves, after the stopping process, the fork to separate the insertion portion away from the facing surface such that a position of the insertion portion with respect to an entrance of the insertion opening does not change in an up-down direction of the vehicle body.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

[First Embodiment]

A forklift 10 according to a first embodiment will now be described with reference to FIGS. 1 to 11.

<Configuration of Forklift>

Figure 1:
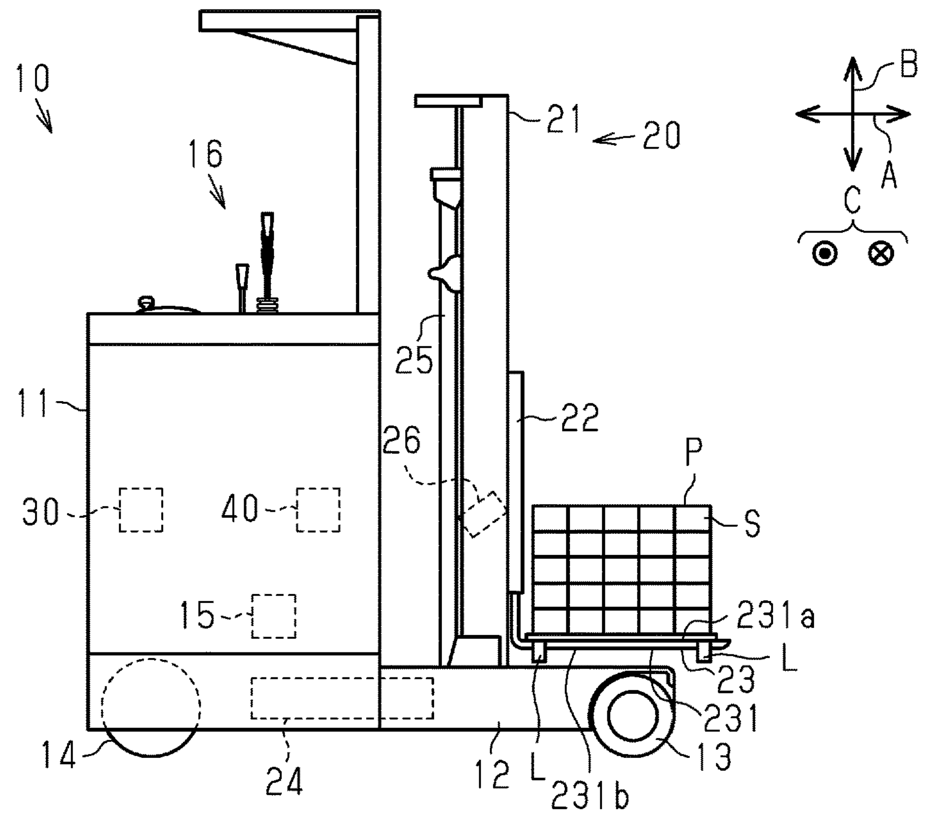
FIG. 1 is a side view of a forklift.

The forklift 10, which is shown in FIG. 1, is used in sites where pallets P are conveyed, such as factories, maritime ports, airports, and commercial facilities. The forklift 10 performs an unloading operation to mount a pallet P and then conveys the pallet P. The pallet P includes a rectangular box-shaped accommodating portion S, which accommodates a conveyed object, and legs L provided at the four corners of the accommodating portion S. The pallet P is a mesh pallet. The forklift 10 of the present embodiment is a reach forklift.

The forklift 10 includes a vehicle body 11, reach legs 12, front wheels 13, rear wheels 14, a traveling motor 15, a cargo handling device 20, and a controlling device 30. In the following description, a front-rear direction of the vehicle body 11 will be referred to as a first direction A, and an up-down direction of the vehicle body 11 will be referred to as a second direction B. A left-right direction of the vehicle body 11 will be referred to as a third direction C. The first direction A and the second direction B are orthogonal to each other. The first direction A and the third direction C are orthogonal to each other.

The reach legs 12 extend forward from the vehicle body 11. The reach legs 12, of which there are two, are spaced apart from each other in the third direction C. The front wheels 13 are respectively provided in the two reach legs 12. The rear wheels 14 are provided in the vehicle body 11. The rear wheels 14 are, for example, steered wheels and driven wheels, which are driven by the traveling motor 15. When the traveling motor 15 is activated, the forklift 10 moves in the first direction A.

The cargo handling device 20 includes mast assemblies 21, a lift bracket 22, and forks 23. The cargo handling device 20 includes a reach cylinder 24, a lift cylinder 25, a tilt cylinder 26, and a hydraulic mechanism 40.

The mast assemblies 21 are multistage mast assemblies. The mast assemblies 21, of which there are two, are spaced apart from each other in the third direction C. The mast assemblies 21 each include an outer mast, a middle mast, and an inner mast, which are slidably engaged with each other. A carriage, which includes the lift bracket 22 and the forks 23, is attached to the mast assemblies 21. The carriage is suspended from the inner masts of the mast assemblies 21 with a chain mechanism (not shown).

The lift bracket 22 is provided between the two mast assemblies 21 to be lifted or lowered in the second direction B. The forks 23, of which there are two, are spaced apart from each other in the third direction C.

The reach cylinder 24 includes a hydraulic cylinder. Supply and drainage of hydraulic fluid to and from the reach cylinder 24 moves the mast assemblies 21 in the first direction A. The forks 23 move in the first direction A together with the mast assemblies 21. An action in which the reach cylinder 24 moves the forks 23 together with the mast assemblies 21 in a forward direction of the vehicle body 11 will be referred to as "reach out."

The lift cylinder 25 includes a hydraulic cylinder. When hydraulic fluid is supplied to or drained from the lift cylinder 25, the mast assemblies 21 extend or retract. Accordingly, the lift bracket 22 ascend or descent in the second direction B along the mast assemblies 21. The forks 23 ascend or descent together with the lift bracket 22 in the second direction B.

The tilt cylinder 26 includes a hydraulic cylinder. The carriage includes a finger bar (not shown) that is attached to the lift bracket 22. The finger bar tilts with respect to the first direction A when hydraulic fluid is supplied to or drained from the tilt cylinder 26. The lift bracket 22 also tilts together with the finger bar. Tilting actions include forward tilting, in which the lift bracket 22 tilts forward with respect to the vehicle body 11, and rearward tilting, in which the lift bracket 22 tilts rearward with respect to the vehicle body 11. The forks 23 tilt together with the lift bracket 22.

Figure 3:
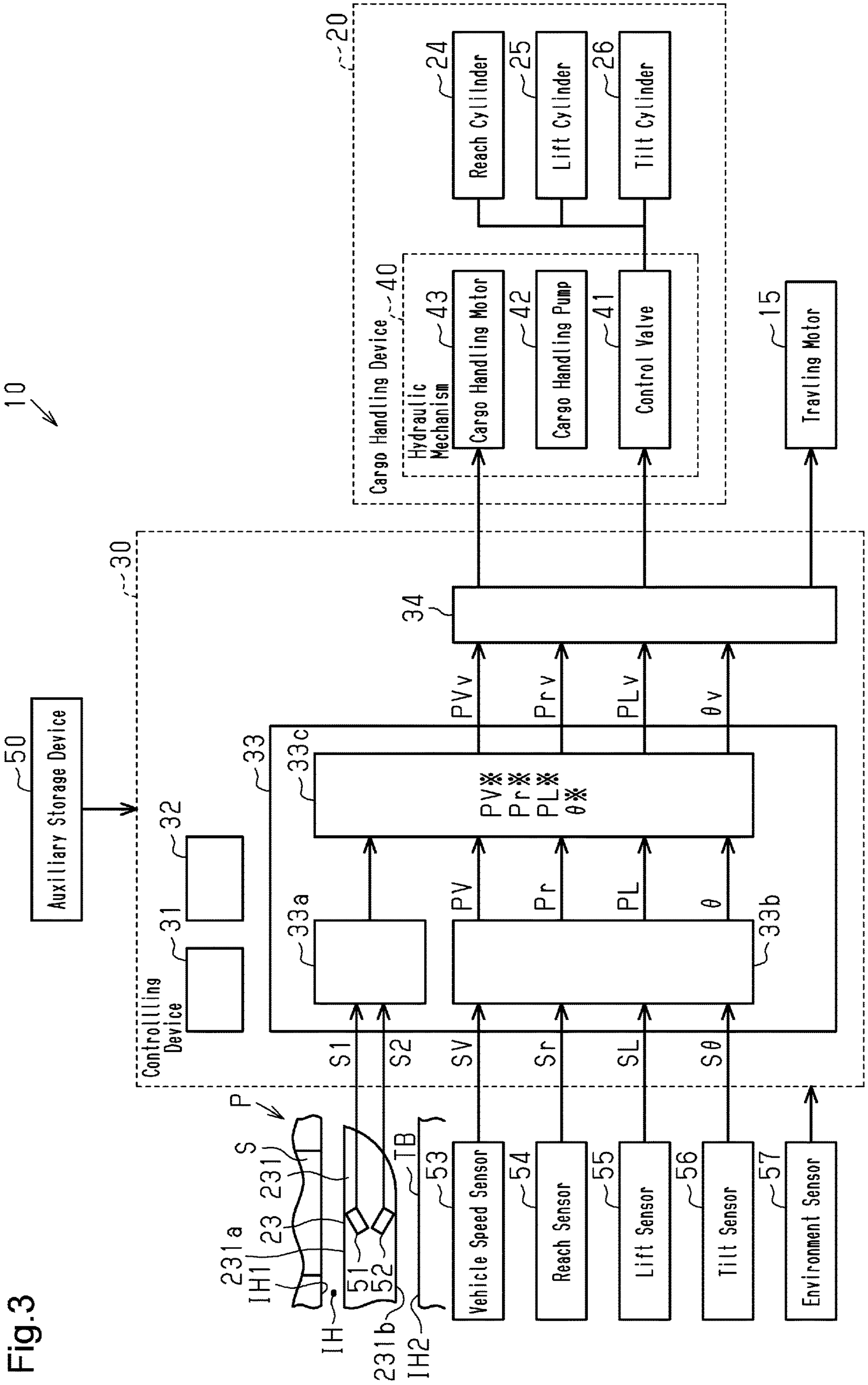
FIG. 3 is a block diagram showing the configuration of the forklift.

As shown in FIG. 3, the hydraulic mechanism 40 is configured to control supply of hydraulic fluid to, and drainage of hydraulic fluid from, hydraulic machines including the reach cylinder 24, the lift cylinder 25, and the tilt cylinder 26. The hydraulic mechanism 40 includes a control valve 41, a cargo handling pump 42, and a cargo handling motor 43. The control valve 41 controls supply of hydraulic fluid to, and drainage of hydraulic fluid from, the reach cylinder 24, the lift cylinder 25, and the tilt cylinder 26. The control valve 41 includes an electromagnetic control valve that regulates the opening degrees of oil passages that supply and drain hydraulic fluid to and from the reach cylinder 24, the lift cylinder 25, and the tilt cylinder 26. The cargo handling pump 42 discharges hydraulic fluid to the control valve 41. The cargo handling motor 43 generates driving force that drives the cargo handling pump 42.

As shown in FIGS. 1 and 3, the traveling motor 15, the reach cylinder 24, and the hydraulic mechanism 40 operate as an example of a moving device, which moves the forks 23 in the first direction A. The lift cylinder 25 and the hydraulic mechanism 40 operate as an example of a lift device, which lifts or lowers the forks 23 in the second direction B. The tilt cylinder 26 and the hydraulic mechanism 40 operate as an example of a tilt device, which tilts the forks 23 with respect to the first direction A.

Figure 2:
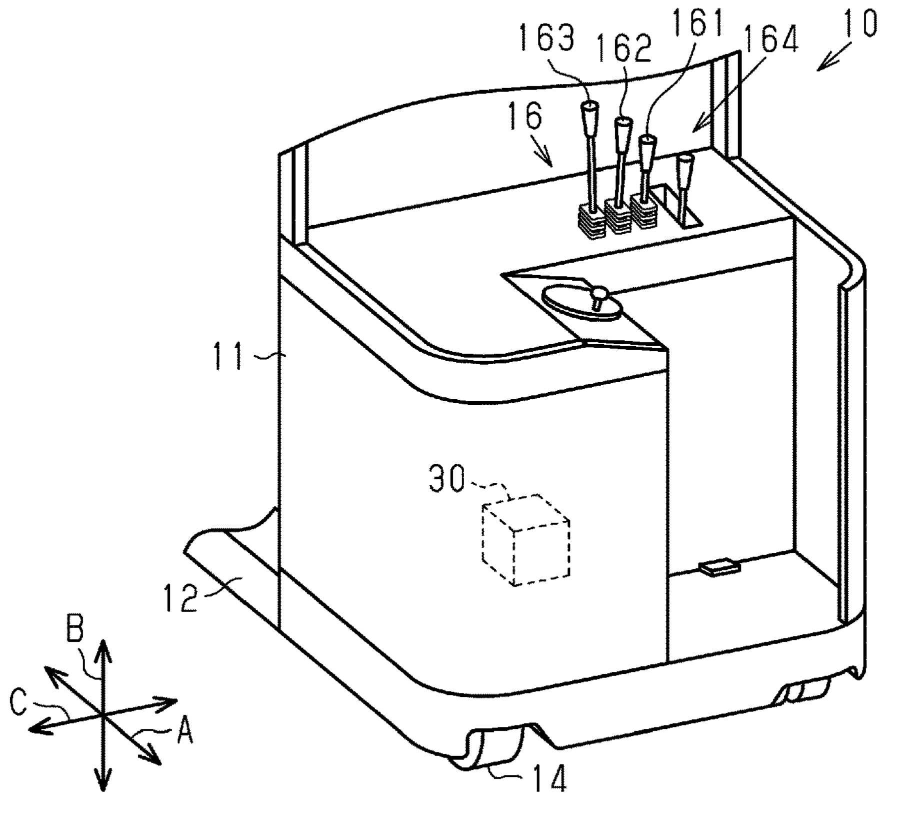
FIG. 2 is a perspective view of the forklift.

As shown in FIGS. 1 and 2, the forklift 10 includes a manipulation portion 16, which is manipulated by an operator of the forklift 10. The manipulation portion 16 includes a reach manipulation unit 161, a lift manipulation unit 162, a tilt manipulation unit 163, and an accelerator manipulation unit 164.

The reach manipulation unit 161 includes a reach lever, which is tilted forward or rearward in the first direction A from a neutral position by the operator of the forklift 10. When the reach lever is tilted forward with respect to the vehicle body 11 from the neutral position, the reach manipulation unit 161 outputs a signal to the controlling device 30. When that signal is output, the forks 23 are moved forward with respect to the vehicle body 11 together with the mast assemblies 21. When the reach lever is tilted rearward with respect to the vehicle body 11 from the neutral position, the reach manipulation unit 161 outputs a signal to the controlling device 30. When that signal is output, the forks 23 are moved rearward with respect to the vehicle body 11 together with the mast assemblies 21.

The lift manipulation unit 162 includes a lift lever, which is tilted forward or rearward from a neutral position in the first direction A from a neutral position by the operator of the forklift 10. When the lift lever is tilted forward with respect to the vehicle body 11 from the neutral position, the lift manipulation unit 162 outputs a signal to the controlling device 30. When that signal is output, the forks 23 are lowered together with the lift bracket 22. When the lift lever is tilted rearward with respect to the vehicle body 11 from the neutral position, the lift manipulation unit 162 outputs a signal to the controlling device 30. When that signal is output, the forks 23 are lifted together with the lift bracket 22.

The tilt manipulation unit 163 includes a tilt lever, which is tilted forward or rearward in the first direction A from a neutral position by the operator of the forklift 10. When the tilt lever is tilted forward with respect to the vehicle body 11 from the neutral position, the tilt manipulation unit 163 outputs a signal to the controlling device 30. When that signal is output, the lift bracket 22 is tilted forward in the first direction A. When the tilt lever is tilted rearward with respect to the vehicle body 11 from the neutral position, the tilt manipulation unit 163 outputs a signal to the controlling device 30. When that signal is output, the lift bracket 22 is tilted rearward with respect to the first direction A.

The accelerator manipulation unit 164 includes an acceleration lever, which is tilted forward or rearward from a neutral position in the first direction A by the operator of the forklift 10. When the acceleration lever is tilted forward with respect to the vehicle body 11 from the neutral position, the accelerator manipulation unit 164 outputs a signal to the controlling device 30. When that signal is output, the traveling motor 15 is driven to cause the forklift 10 to advance. When the acceleration lever is tilted rearward with respect to the vehicle body 11 from the neutral position, the accelerator manipulation unit 164 outputs a signal to the controlling device 30. When that signal is output, the traveling motor 15 is driven to cause the forklift 10 to reverse.

Figure 4:
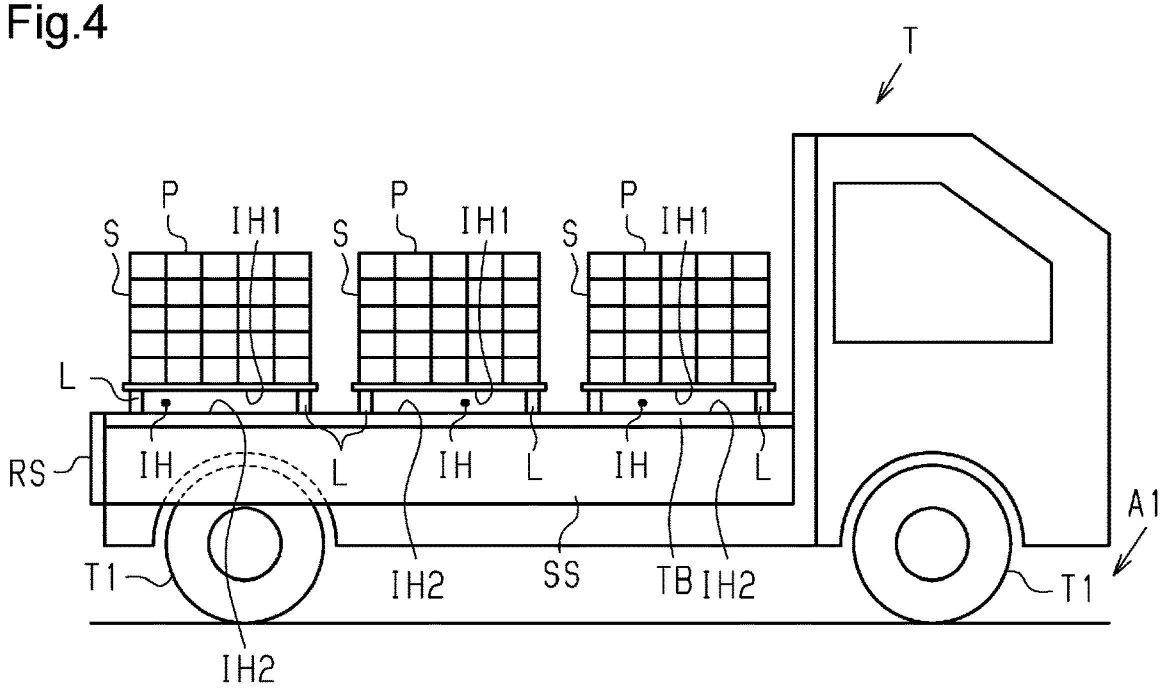
FIG. 4 is a schematic diagram showing a truck that mounts pallets.
Figure 5:
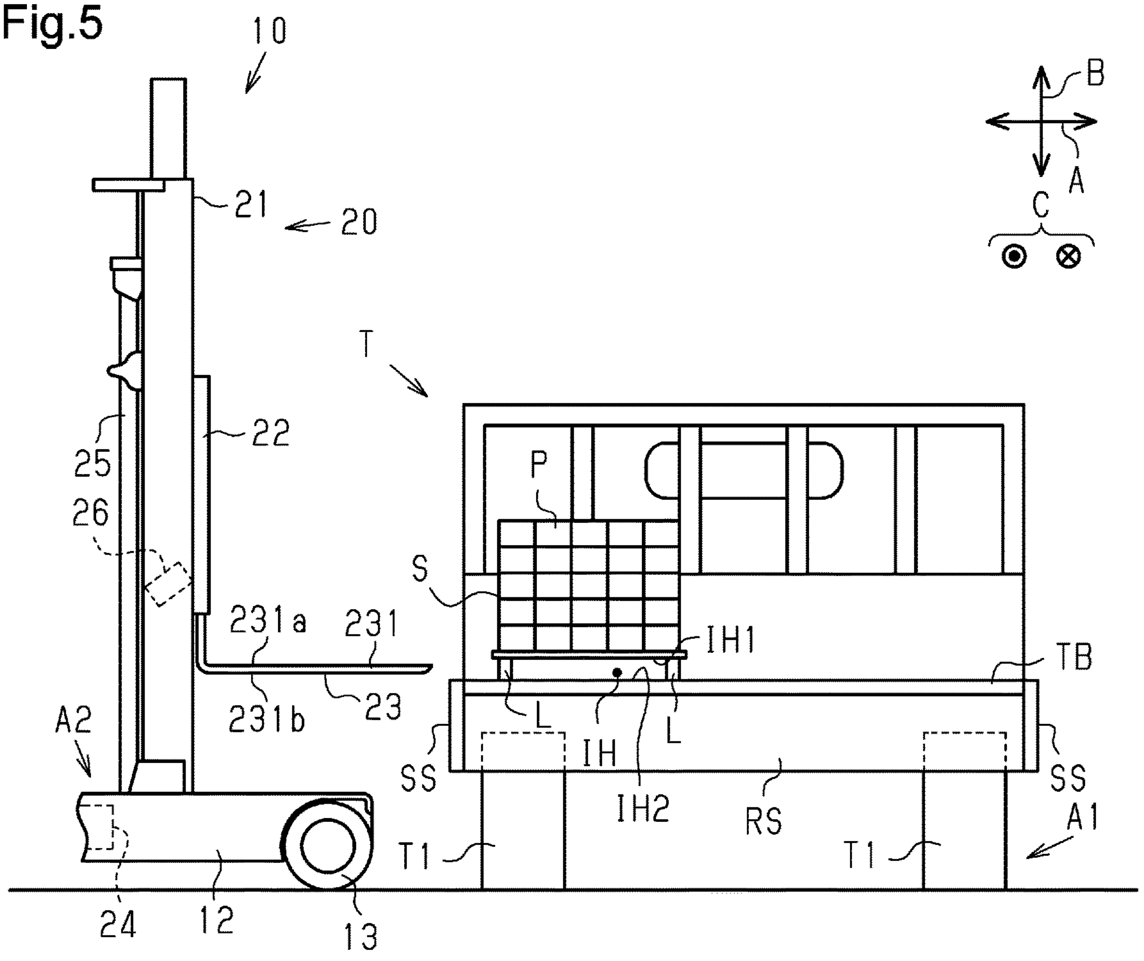
FIG. 5 is a diagram showing the positional relationship between the truck and the forklift when an unloading operation is performed.

As shown in FIGS. 4 and 5, the forklift 10 performs an unloading operation of pallets P mounted on the truck T. A parking position A1 of the truck T is determined in advance. After moving to an unloading position A2, the forklift 10 performs the unloading operation. The truck T includes a loading platform TB, side gates SS, a tail gate RS, and tires T1.

Pallets P are mounted on the loading platform TB. The side gates SS are provided on the sides of the loading platform TB. The side gates SS can be swung upward or downward with respect to the truck T. The tail gate RS is provided in a rear part of the loading platform TB. The tail gate RS can be swung upward or downward with respect to the truck T. The side gates SS and the tail gate RS surround the loading platform TB, for example, when the truck T is traveling. When the forklift 10 performs an unloading operation, the side gates SS and the tail gate RS have been pivoted downward, so that the side gates SS and the tail gate RS do not face the pallets P. That is, when the forklift 10 performs an unloading operation, the side gates SS and the tail gate RS are pivoted so as not to hinder the unloading operation by the forklift 10.

When a pallet P is placed on the loading platform TB as shown in FIG. 5, an insertion opening IH is defined by the loading platform TB, the legs L, and the accommodating portion S. The forks 23 are inserted into the insertion opening IH when the pallet P is mounted on the forks 23 of the forklift 10. The forklift 10 performs the unloading operation on the side facing a side gate SS of the truck T. The unloading operation is completed when the pallet P is mounted on the forks 23 after the forks 23 are inserted into the insertion opening IH. The forks 23 each include an insertion portion 231, which is inserted into the insertion opening IH.

As shown in FIG. 1, the insertion portions 231 of the forks 23 support the bottom of the accommodating portion S. The insertion portions 231 each have the shape of a plate. The insertion portions 231 each include a first surface 231*a*, which faces the bottom of the accommodating portion S, and a second surface 231*b*, which is on a side opposite to the first surface 231*a* in the thickness direction of the insertion portions 231.

As shown in FIG. 3, the forklift 10 includes an auxiliary storage device 50, a first sensor 51, a second sensor 52, and a vehicle speed sensor 53. The forklift 10 also includes a reach sensor 54, a lift sensor 55, a tilt sensor 56, and an environment sensor 57.

The auxiliary storage device 50 stores information that can be read by the controlling device 30. The auxiliary storage device 50 may be a hard disk drive or a solid state drive. The auxiliary storage device 50 stores map information. The map information includes information related to physical structure of the environment surrounding the forklift 10, such as the shape and the size of the environment in which the forklift 10 is used. Positions such as the parking position A1 and the unloading position A2 are expressed as coordinates in the map information. The map information is data that uses coordinates to express the environment in which the forklift 10 is used. The map information may be stored in the auxiliary storage device 50 in advance if the surrounding environment in which the forklift 10 is used is known in advance. If the map information is stored in the auxiliary storage device 50 in advance, the coordinates of structures of which the positions hardly change are stored as the map information. The map information may be generated by simultaneous localization and mapping (SLAM). Mapping is performed by forming local maps from coordinates acquired by the environment sensor 57, and combining the local maps together in accordance with the self-position of the forklift 10. The environment sensor 57 allows the controlling device 30 to recognize relative positions of the forklift 10 and objects behind the forklift 10. The environment sensor 57 may include a millimeter wave radar, a stereo camera, or a laser imaging detection and ranging (LIDAR) sensor.

The first sensor 51 and the second sensor 52 are provided at the distal end of the insertion portion 231 of a fork 23. The first sensor 51 and the second sensor 52 are embedded in the insertion portion 231. The first sensor 51 is closer to the first surface 231*a* in the thickness direction of the insertion portion 231. The second sensor 52 is closer to the second surface 231*b* in the thickness direction of the insertion portion 231. The surfaces that define the insertion opening IH include facing surfaces, which face the insertion portion 231 in the thickness direction of the insertion portion 231. The facing surfaces include a first facing surface IH1, which faces the first surface 231*a* of the insertion portion 231, and a second facing surface IH2, which faces the second surface 231*b* of the insertion portion 231. The first facing surface IH1 is a surface of the accommodation portion S that faces the loading platform TB. The second facing surface IH2 is an upper surface of the loading platform TB.

The first sensor 51 and the second sensor 52 are, for example, reflective photoelectronic sensors. The first sensor 51 outputs a signal S1 to the controlling device 30 when the distance to the first facing surface IH1 is less than or equal to a specified value. The second sensor 52 outputs a signal S2 to the controlling device 30 when the distance to the second facing surface IH2 is less than or equal to a specified value. The first sensor 51 and the second sensor 52 each detect that the insertion portion 231 has approached a facing surface. The first sensor 51 and the second sensor 52 may be changed to proximity sensors, distance sensors, limit switches, force sensors, or contact sensors.

The vehicle speed sensor 53 outputs to the controlling device 30 a signal SV, which corresponds to the vehicle speed of the forklift 10 when the forklift 10 is traveling. The reach sensor 54 outputs to the controlling device 30 a signal Sr, which corresponds to a movement amount Pr of the mast assemblies 21 when the mast assemblies 21 are moved by the reach cylinder 24. The lift sensor 55 outputs to the controlling device 30 a signal SL, which corresponds to a height PL of the forks 23, which have been lifted or lowered by the lift cylinder 25. The tilt sensor 56 outputs to the controlling device 30 a signal Sθ, which corresponds to a tilt angle θ of the lift bracket 22, which has been tilted by the tilt cylinder 26. The tilt angle θ is an inclination angle of the lift bracket 22 with respect to the first direction A.

<Configuration of Controlling Device>

As shown in FIG. 3, the controlling device 30 includes a processor 31, such as a CPU and a GPU, and a storage unit 32, which includes RAM and ROM. The storage unit 32 stores program codes or commands configured to cause the processor 31 to execute processes. The storage unit 32, which is a computer-readable medium, includes any type of medium that is accessible by a general-purpose computer or a dedicated computer. The controlling device 30 may include a hardware circuit such as an application specific integrated circuit (ASIC) and a field programmable gate array (FPGA). The controlling device 30, which is processing circuitry, may include one or more processors that operate according to a computer program, one or more hardware circuits such as an ASIC and an FPGA, or a combination thereof.

The controlling device 30 controls the traveling motor 15 and the hydraulic mechanism 40 in accordance with programs stored in the storage unit 32. This causes the forklift 10 to travel, and the reach cylinder 24, the lift cylinder 25, and the tilt cylinder 26 to operate. In other words, the controlling device 30 controls the moving device, the lift device, and the tilt device. The forklift 10 of the present embodiment is not operated by an operator. The forklift 10 is an autonomous forklift that operates automatically through control of the moving device, the lift device, and the tilt device by the controlling device 30. Program codes or commands stored in the storage unit 32 may be stored in the auxiliary storage device 50 in place of the storage unit 32.

The controlling device 30 executes a self-position estimation process. The self-position estimation process is a process that estimates the self-position of the forklift 10 on the map information stored in the auxiliary storage device 50. The controlling device 30 controls the traveling motor 15 while executing the self-position estimation process, thereby moving the forklift 10 to the unloading position A2. The self-position estimation process may be executed through odometry, which estimates the movement amount using the number of rotations of the traveling motor 15. Alternatively, the self-position estimation process may be executed based on results of matching between landmarks and the map information. Further, these two methods may be combined to execute the self-position estimation process. If the forklift 10 is used outdoors, the self-position may be estimated using the global positioning system (GPS). The self-position refers to a coordinate that represents a point in the vehicle body 11, for example, the coordinate of the center in the horizontal direction of the vehicle body 11.

The forklift 10 is capable of adjusting the height of the forks 23 so that the distal ends of the insertion portions 231 face the insertion opening IH when the forklift 10 reaches the unloading position A2. The controlling device 30 moves the forks 23 in the first direction A by advancing the forklift

10 from the unloading position A2 or reaching out the mast assemblies 21. This inserts the insertion portions 231 into the insertion opening IH. When the forklift 10 performs an unloading operation, the controlling device 30 executes a process for properly inserting the insertion portions 231 into the insertion opening IH. The process for properly inserting the insertion portions 231 into the insertion opening IH will be discussed in detail below.

The controlling device 30 includes a fork insertion controlling unit 33 and a command value calculating unit 34. The fork insertion controlling unit 33 receives the signals S1, S2, SV, Sr, SL, and Sθ. Based on the signals S1, S2, SV, Sr, SL, and Sθ, the fork insertion controlling unit 33 calculates voltage values Pry, PLv, θv, and PVv of signals that would need to be output by the manipulation portion 16. Based on the signals S1, S2, SV, Sr, SL, and Sθ, the fork insertion controlling unit 33 calculates the voltage values Pry, PLv, θv, and PVv, which would be expected to be output if the manipulation portion 16 were manipulated by the operator. The voltage value Pry is an estimated voltage value of a signal that would be output by the reach manipulation unit 161. The voltage value PLv is an estimated voltage value of a signal that would be output by the lift manipulation unit 162. The voltage value θv is an estimated voltage value of a signal that would be output by the tilt manipulation unit 163. The voltage value PVv is an estimated voltage value of a signal that would be output by the accelerator manipulation unit 164. The fork insertion controlling unit 33 outputs to the command value calculating unit 34 signals that respectively have the voltage values Prv, PLv, θv, and PVv.

<Configuration of Fork Insertion Controlling Unit>

As shown in FIG. 3, the fork insertion controlling unit 33 includes a proximity detecting unit 33*a*, a position calculating unit 33*b*, and a target position calculating unit 33*c*.

The proximity detecting unit 33*a* receives the signal S1 of the first sensor 51 and the signal S2 of the second sensor 52. When receiving only the signal S1, the proximity detecting unit 33*a* determines that the insertion portions 231 have approached the first facing surface IH1 to such an extent that the distance between the first surfaces 231*a* of the insertion portions 231 and the first facing surface IH1 is less than or equal to the specified value. This determination result will hereafter be referred to as a first result.

When receiving only the signal S2, the proximity detecting unit 33*a* determines that the insertion portions 231 have approached the second facing surface IH2 to such an extent that the distance between the second surface 231*b* of the insertion portions 231 and the second facing surface IH2 is less than or equal to the specified value. This determination result will hereafter be referred to as a second result.

When receiving neither the signal S1 nor the signal S2, the proximity detecting unit 33*a* determines that the insertion portions 231 have not approached any of the facing surfaces of the insertion opening IH to such an extent that the distance between the insertion portions 231 and the facing surface of the insertion opening IH is less than or equal to the specified value. This determination result will hereafter be referred to as a third result.

When receiving both of the signal S1 and the signal S2, the proximity detecting unit 33*a* determines that there is an anomaly in both of the first sensor 51 and the second sensor 52. This determination result will hereafter be referred to as a fourth result. The proximity detecting unit 33*a* outputs the determination result to the target position calculating unit 33*c*.

The position calculating unit 33*b* receives the signals SV, Sr, SL, and Sθ. The position calculating unit 33*b* calculates the movement amount Pr of the mast assemblies 21 based on the signal Sr. The position calculating unit 33*b* calculates the height PL of the forks 23 based on the signal SL. The position calculating unit 33*b* calculates the tilt angle θ of the lift bracket 22 based on the signal Sθ. The position calculating unit 33*b* calculates the vehicle speed of the forklift 10 based on the signal SV, and calculates the movement amount PV of the forklift 10 based on the vehicle speed. The position calculating unit 33*b* outputs the movement amount Pr, the height PL, the tilt angle θ, and the movement amount PV to the target position calculating unit 33*c*.

The target position calculating unit 33*c* receives the determination result output from the proximity detecting unit 33*a*, and the movement amount Pr, the height PL, the tilt angle θ, and the movement amount PV output from the position calculating unit 33*b*.

The target position calculating unit 33*c* calculates a target mast position Pr*. The target mast position Pr* is calculated based on the received determination result and the movement amount Pr and represents a target position in the first direction A at which the mast assemblies 21 should be. The target position calculating unit 33*c* calculates the voltage value Prv. The voltage value Pry is an estimated voltage value of a signal that would be output from the reach manipulation unit 161 if the reach manipulation unit 161 were manipulated to achieve the target mast position Pr*. The target position calculating unit 33*c* outputs a signal that has the voltage value Pry to the command value calculating unit 34.

The target position calculating unit 33*c* calculates a target fork height PL*. The target fork height PL* is calculated based on the received determination result and the height PL and represents a target position in the second direction B at which the forks 23 should be. The target position calculating unit 33*c* calculates the voltage value PLv. The voltage value PLv is an estimated voltage value of a signal that would be output from the lift manipulation unit 162 if the lift manipulation unit 162 were manipulated to achieve the target fork height PL*. The target position calculating unit 33*c* outputs a signal that has the voltage value PLv to the command value calculating unit 34.

The target position calculating unit 33*c* calculates a target tilt angle θ*. The target tilt angle θ* is calculated based on the received determination result and the tilt angle θ and represents a target tilt angle with respect to the first direction A of the lift bracket 22. The target position calculating unit 33*c* calculates a voltage value θv. The voltage value θv is an estimated voltage value of a signal that would be output from the tilt manipulation unit 163 if the tilt manipulation unit 163 were manipulated to achieve the target tilt angle θ*. The target position calculating unit 33*c* outputs a signal that has the voltage value θv to the command value calculating unit 34.

The target position calculating unit 33*c* calculates a target vehicle position PV*. The target vehicle position PV* is calculated based on the received determination result and the movement amount PV and represents a target position in the first direction A at which the forklift 10 should be. The target position calculating unit 33*c* calculates the voltage value PVv. The voltage value PVv is an estimated voltage value of a signal that would need to be output from the accelerator manipulation unit 164 if the accelerator manipulation unit 164 were manipulated to achieve the target vehicle position PV*. The target position calculating unit 33*c* outputs a signal that has the voltage value PVv to the command value calculating unit 34.

<Command Value Calculating Unit>

The command value calculating unit 34 receives signals having the voltage values Pry, PLv, θv, and PVv. Based on the signals having the voltage values Pry, PLv, θv, and PVv, the command value calculating unit 34 calculates command values that drive the traveling motor 15, the control valve 41, and the cargo handling motor 43. The command values represent the ratio of the output power of the traveling motor 15, the control valve 41, and the cargo handling motor 43. The command value calculating unit 34 outputs signals having voltage values that achieve the command values to the traveling motor 15, the control valve 41, and the cargo handling motor 43. The traveling motor 15, the control valve 41, and the cargo handling motor 43 are controlled by the signals output from the command value calculating unit 34. If the operator of the forklift 10 manipulates the manipulation portion 16, the command value calculating unit 34 calculates the command values for the traveling motor 15, the control valve 41, and the cargo handling motor 43 based on the voltage values of signals output by the manipulation portion 16.

Process for Properly Inserting Insertion Portions into Insertion Opening

Figure 6:
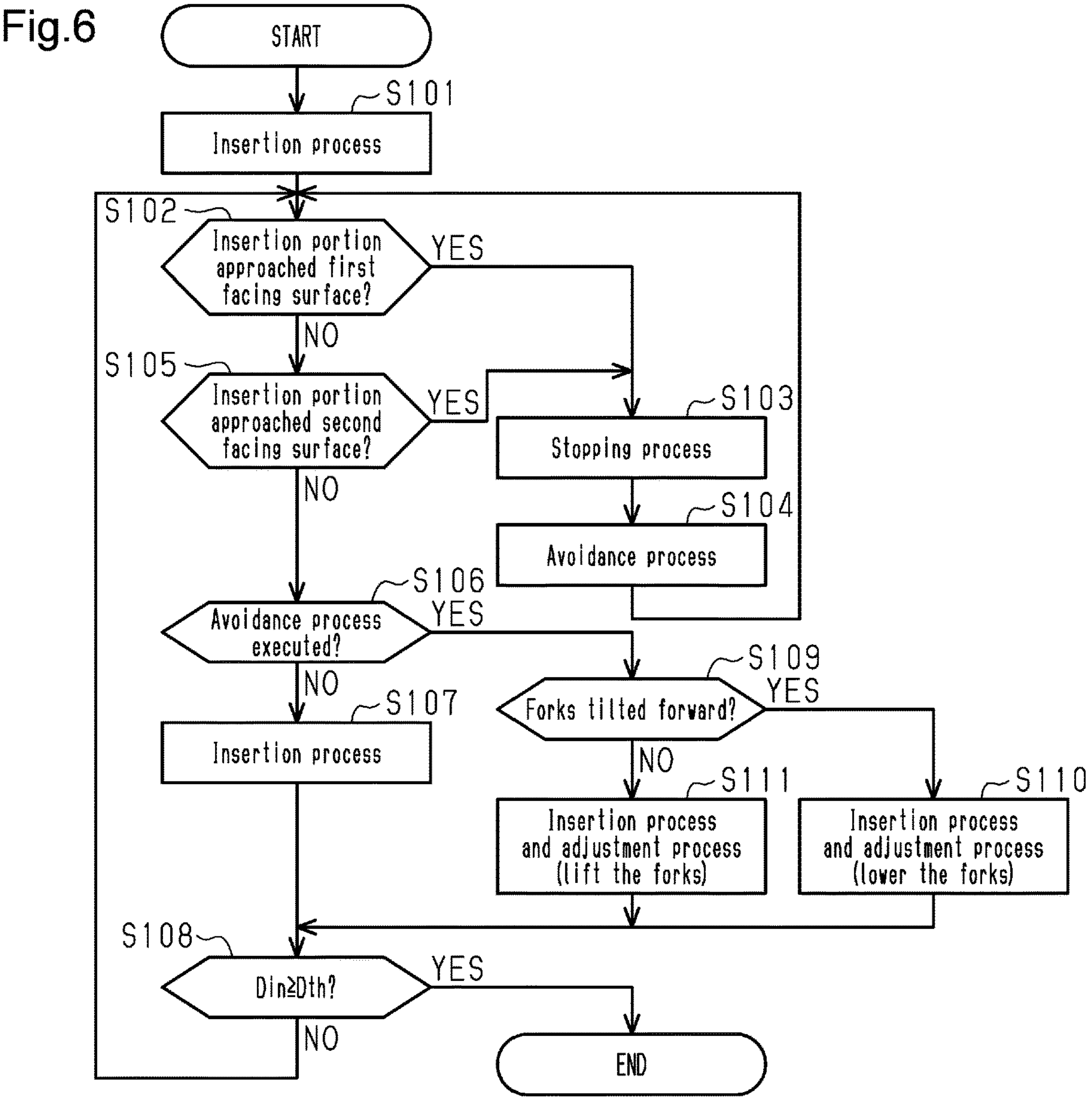
FIG. 6 is a flowchart showing a process flow executed by a controlling device of the forklift according to a first embodiment.

As shown in FIG. 6, when the process for properly inserting the insertion portions 231 into the insertion opening IH is started, the controlling device 30 executes an insertion process in step S101. The insertion process is a process in which the controlling device 30 controls the moving device to insert the insertion portions 231 of the forks 23 into the insertion opening IH. The process for properly inserting the insertion portions 231 into the insertion opening IH is started with the insertion portions 231 extending in the first direction A. Also, the process for properly inserting the insertion portions 231 into the insertion opening IH is started without the mast assemblies 21 reaching out. After executing step S101, the controlling device 30 advances the process to step S102.

In step S102, the controlling device 30 determines whether the insertion portions 231 have approached the first facing surface IH1. Step S102 is executed by the proximity detecting unit 33*a*. When determining that the insertion portions 231 have approached the first facing surface IH1 in step S102 (step S102: YES), the controlling device 30 advances the process to step S103. A case in which it is determined that the insertion portions 231 have approached the first facing surface IH1 in step S102 (step S102: YES) is a case in which the proximity detecting unit 33*a* has output the first result.

In step S103, the controlling device 30 executes a stopping process. After executing step S103, the controlling device 30 advances the process to step S104. In step S104, the controlling device 30 executes an avoidance process. After executing step S104, the controlling device 30 advances the process to step S102 again.

When determining that the insertion portions 231 have not approached the first facing surface IH1 in step S102 (step S102: NO), the controlling device 30 advances the process to step S105.

In step S105, the controlling device 30 determines whether the insertion portions 231 have approached the second facing surface IH2. Step S105 is executed by the proximity detecting unit 33*a*. When determining that the insertion portions 231 have approached the second facing surface IH2 in step S105 (step S105: YES), the controlling device 30 advances the process to step S103. A case in which it is determined that the insertion portions 231 have approached the second facing surface IH2 in step S105 (step S105: YES) is a case in which the proximity detecting unit 33*a* has output the second result.

When determining that the insertion portions 231 have not approached the second facing surface IH2 in step S105 (step S105: NO), the controlling device 30 advances the process to step S106. A case in which the decisions of both of steps S102 and S105 are NO is a case in which the proximity detecting unit 33*a* has output the third result. A case in which the decisions of both of steps S102 and S105 are YES is a case in which the proximity detecting unit 33*a* has output the fourth result. Although not illustrated in FIG. 6, when the proximity detecting unit 33*a* outputs the fourth result, the process for properly inserting the insertion portions 231 into the insertion opening IH is ended.

In step S106, the controlling device 30 determines whether the avoidance process has been executed. In step S106, the controlling device 30 determines whether the tilt angle θ, which has been calculated by the position calculating unit 33*b*, is 0. When determining that the avoidance process has not been executed in step S106 (step S106: NO), the controlling device 30 advances the process to step S107. That is, when determining that the avoidance process has not been executed (step S106: NO), the controlling device 30 advances the process to step S107. A case in which the controlling device 30 determines that the avoidance process has not been executed (step S106: NO) is equivalent to a case in which the controlling device 30 determines that the tilt angle θ, which has been calculated by the position calculating unit 33*b*, is 0. The controlling device 30 executes the insertion process in step S107. This is equivalent to a case in which the controlling device 30 continues to execute the insertion process that is executed in step S101. After executing step S107, the controlling device 30 advances the process to step S108.

When determining that the avoidance process has been executed in step S106 (step S106: YES), the controlling device 30 advances the process to step S109. That is, the controlling device 30 advances the process to step S109 when determining that the tilt angle θ, which has been calculated by the position calculating unit 33*b*, is not 0 (step S106: YES).

In step S109, the controlling device 30 determines whether the forks 23 are tilted forward together with the lift bracket 22. The controlling device 30 determines whether the tilt angle θ, which has been calculated by the position calculating unit 33*b*, is less than 0. When determining that the forks 23 are tilted forward in step S109 (step S109: YES), the controlling device 30 advances the process to step S110. In other words, the controlling device 30 advances the process to step S110 when determining that the tilt angle θ, which has been calculated by the position calculating unit 33*b*, is less than 0 in step S109 (step S109: YES).

When determining that the forks 23 are not tilted forward in step S109 (step S109: NO), the controlling device 30 advances the process to step S111. In other words, the controlling device 30 advances the process to step S111 when determining that the tilt angle θ, which has been calculated by the position calculating unit 33*b*, is greater than 0 in step S109 (step S109: NO).

In each of step S110 and step S111, the controlling device 30 simultaneously executes an insertion process and an adjustment process. The adjustment process executed in step S110 is a process that controls the lift device to lift the forks 23. The adjustment process executed in step S111 is a process that controls the lift device to lower the forks 23. After executing step S110 or step S111, the controlling device 30 advances the process to step S108.

In step S108, the controlling device 30 determines whether an inserted amount Din of the insertion portions 231 into the insertion opening IH is greater than or equal to a prescribed value Dth. The inserted amount Din represents the length by which the insertion portions 231 are inserted into the insertion opening IH. The controlling device 30 calculates the inserted amount Din.

The controlling device 30 calculates the inserted amount Din based on the movement amount PV of the forklift 10 from the unloading position A2, the movement amount Pr of the reached-out mast assemblies 21, and the tilt angle θ of the lift bracket 22. If the insertion portions 231 are inserted into the insertion opening IH while remaining extended in the first direction A, the inserted amount Din is the sum of the movement amount PV of the forklift 10 and the movement amount Pr of the mast assemblies 21.

When the insertion portions 231 are inserted into the insertion opening IH with the lift bracket 22 tilted with respect to the first direction A, the inserted amount Din is calculated taking into consideration the movement amount PV of the forklift 10, the movement amount Pr of the mast assemblies 21, and the tilt angle θ. It is now assumed that the insertion process is executed multiple times. In this case, an inserted amount of the insertion portions 231 into the insertion opening IH is calculated taking into consideration the tilt angle θ in each insertion process, and the inserted amount Din is calculated by adding up the inserted amounts in the number of times the insertion process has been executed. The prescribed value Dth is stored in the storage unit 32.

When determining that the inserted amount Din is not greater than or equal to the prescribed value Dth in step S108 (step S108: NO), the controlling device 30 returns the process to step S102 again. When determining that the inserted amount Din is greater than or equal to the prescribed value Dth in step S108 (step S108: YES), the controlling device 30 ends all the processes for inserting the insertion portions 231 into the insertion opening IH.

Stopping Process, Avoidance Process, and Adjustment Process

Figure 7:
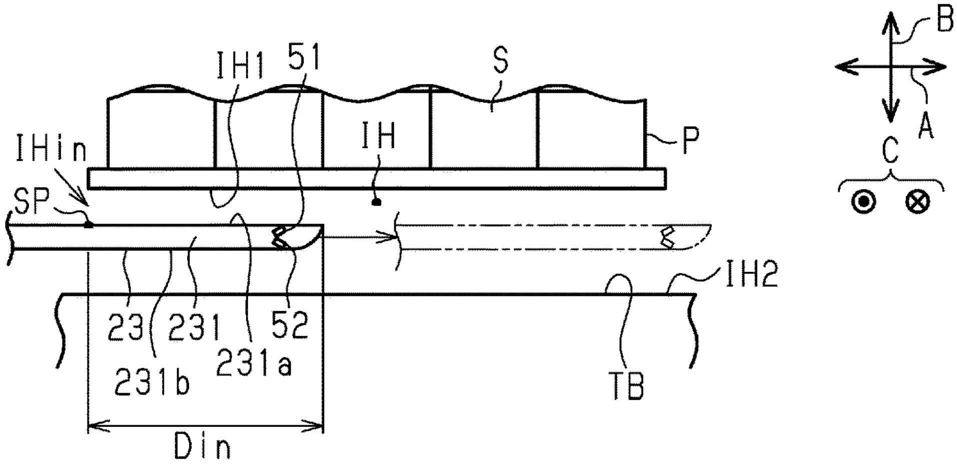
FIG. 7 is a diagram showing insertion of an insertion portion into an insertion opening when the loading platform of the truck is not inclined with respect to a first direction A.

If the loading platform TB of the truck T is not inclined with respect to the first direction A in the unloading operation as shown in FIG. 7, the insertion process is continued without being stopped from when the insertion portions 231 are inserted into the insertion opening IH to such an extent that the inserted amount Din is greater than or equal to the prescribed value Dth. When the inserted amount Din of the insertion portions 231 into the insertion opening IH is greater than or equal to the prescribed value Dth, insertion process is stopped. That is, all the processes for inserting the insertion portions 231 into the insertion opening IH are ended. In the control flow of the controlling device 30 in this case, the decisions of steps S102, S105, S106 are each NO, the insertion process is continued in step S107, and then the decision of step S108 is YES. For illustrative purposes, FIG. 7 only illustrates an insertion portion 231 of a fork 23 and the insertion opening IH without showing the whole forklift 10.

If the loading platform TB of the truck T is inclined with respect to the first direction A in the unloading operation, insertion of the insertion portions 231 into the insertion opening IH by step S101 results in the decision of step S102 or step S105 being YES. In this case, the stopping process is executed in step S103.

The stopping process is a process that stops the moving device, the lift device, and the tilt device when the first sensor 51 detects a proximity state in which the insertion portions 231 and the first facing surface IH1 have approached each other to such an extent that the distance between the insertion portions 231 and the first facing surface IH1 is less than or equal to the specified value. Also, the stopping process is a process that stops the moving device, the lift device, and the tilt device when the second sensor 52 detects a proximity state in which the insertion portions 231 and the second facing surface IH2 have approached each other to such an extent that the distance between the insertion portions 231 and the second facing surface IH2 is less than or equal to the specified value.

The stopping process is a process that stops the moving device, the lift device, and the tilt device when the first sensor 51 and the second sensor 52 detect the proximity state. The stopping process is a process that stops operation of the traveling motor 15, the control valve 41, and the cargo handling motor 43 when the proximity detecting unit 33*a* outputs the first result or the second result. In the stopping process, the target position calculating unit 33*c* outputs signals that respectively have the voltage values PVv, Prv, PLv, and θv for stopping the traveling motor 15, the control valve 41, and the cargo handling motor 43.

The avoidance process is executed after the stopping process. A situation illustrated by FIGS. 8 and 9, in which the loading platform TB is inclined such that a given point on the loading platform TB approaches the ground surface as that point moves away from the forks 23 in the first direction A, will be referred to as a first situation. The avoidance process in the first situation will now be described.

Figure 8:
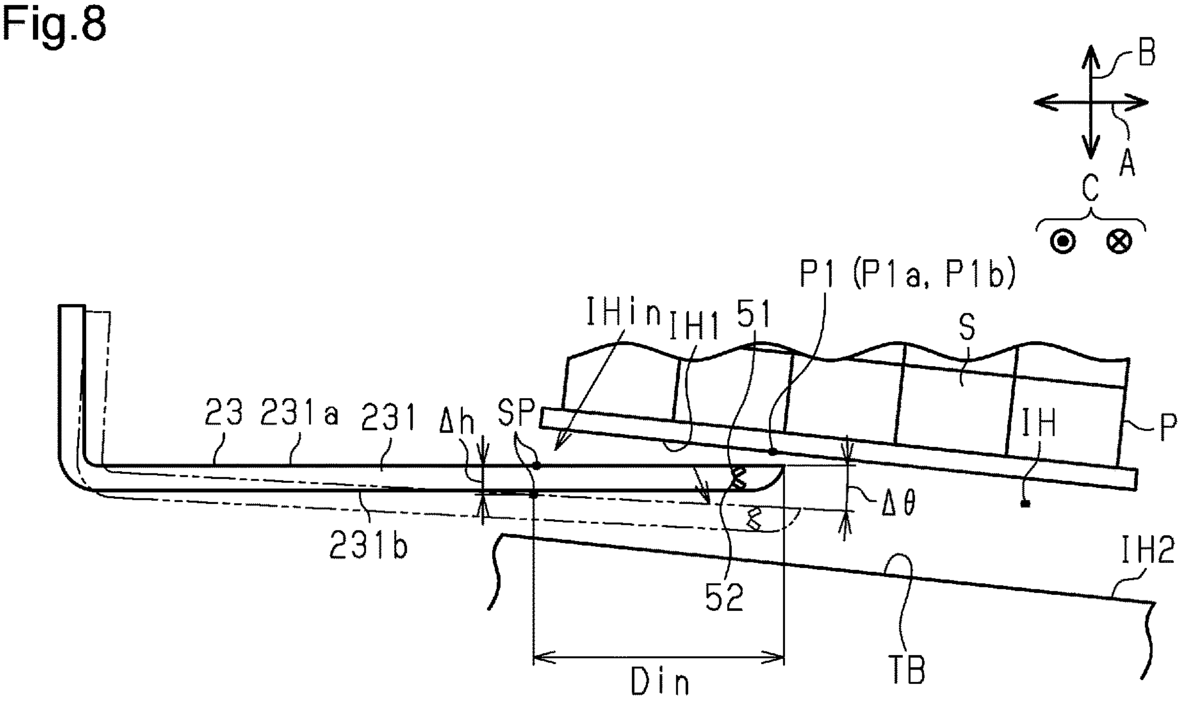
FIG. 8 is a diagram showing a tilting motion of the insertion portion in an avoidance process according to the first embodiment.
Figure 9:
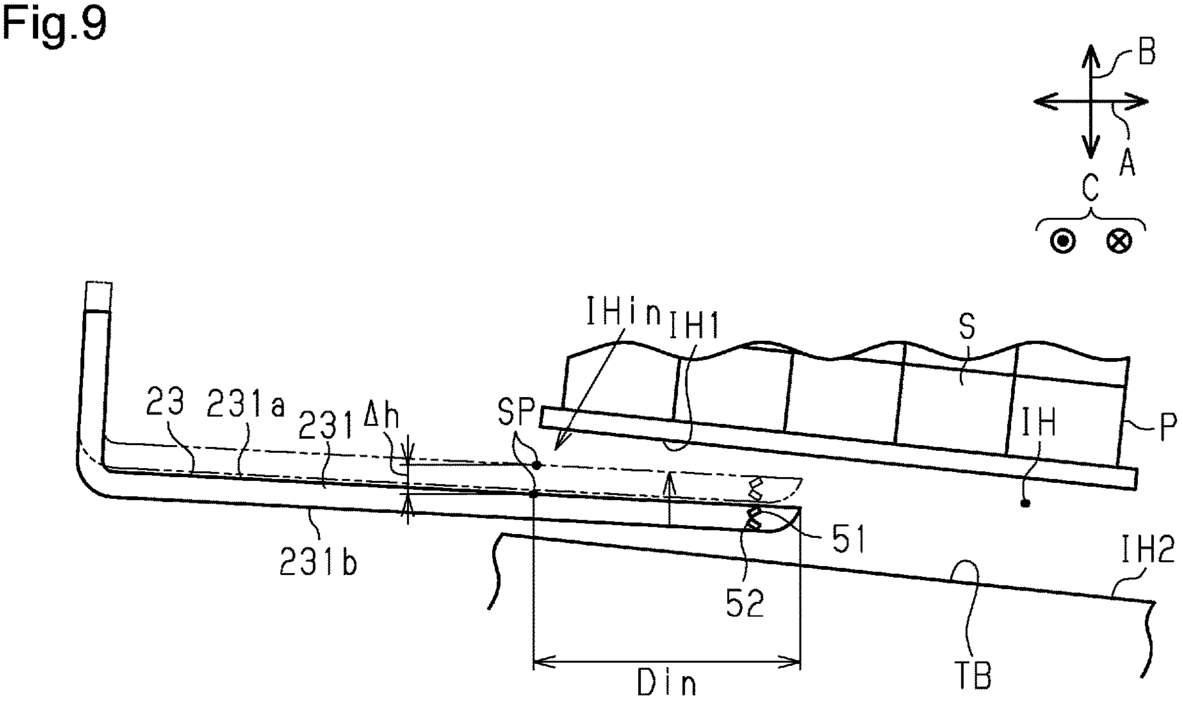
FIG. 9 is a diagram showing an ascent of the insertion portion in the avoidance process according to the first embodiment.

As shown in FIGS. 8 and 9, the avoidance process in the first situation is a process that tilts the insertion portions 231 in the forward direction of the forklift 10 and then lifts the insertion portions 231 in the second direction B. For illustrative purposes, FIGS. 8 and 9 only illustrate a fork 23 and the insertion opening IH without showing the whole forklift 10.

Figure 10:
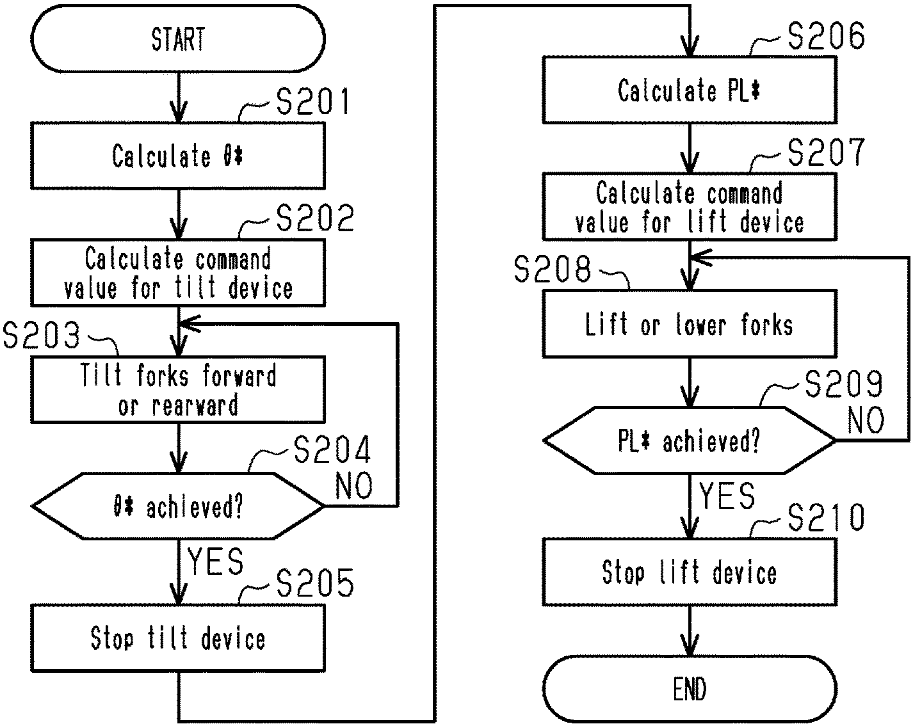
FIG. 10 is a flowchart showing a process flow of the avoidance process according to the first embodiment.

As shown in FIG. 10, the controlling device 30 first executes step S201 in the avoidance process. The controlling device 30 calculates the target tilt angle θ* in step S201. Step S201 is executed by the target position calculating unit 33*c*. In step S201, the controlling device 30 calculates the target tilt angle θ* by adding an angle Δθ to the tilt angle θ, which has been output by the position calculating unit 33*b*. The angle Δθ is a fixed value. The angle Δθ is, for example, −1°. The fixed value is an angle that was set in advance after confirming the fact that the distance between the insertion portions 231 and the first facing surface IH1 can be greater than the specified value. The fixed value is an angle that was set in advance after confirming the fact that the distance between the insertion portions 231 and the second facing surface IH2 can be greater than the specified value. After executing step S201, the controlling device 30 advances the process to step S202.

In step S202, the controlling device 30 calculates a command value for operating the tilt device. In step S202, the controlling device 30 calculates command values for the control valve 41 and the cargo handling motor 43 that achieve the target tilt angle θ*, which has been calculated in step S201. After executing step S202, the controlling device 30 advances the process to step S203.

In step S203, the controlling device 30 outputs signals having voltage values that achieve the command values calculated in step S202 to the control valve 41 and the cargo handling motor 43, thereby activating the tilt cylinder 26. That is, the controlling device 30 tilts the forks 23 forward by controlling the tilt device in step S203. Steps S202 and S203 are executed by the command value calculating unit 34. After executing step S203, the controlling device 30 advances the process to step S204.

In step S204, the controlling device 30 determines whether the target tilt angle θ*, which has been calculated in step S201, has been achieved. The process of step S204 is executed by the target position calculating unit 33*c*. In step S204, the controlling device 30 determines whether the tilt angle θ, which has been output by the position calculating unit 33*b* based on the signal Sθ output by the tilt sensor 56, agrees with the target tilt angle θ*.

When determining that the target tilt angle θ* has not been achieved in step S204 (step S204: NO), the controlling device 30 continues executing the process to step S203. That is, the signals that are delivered to the control valve 41 and the cargo handling motor 43 from the command value calculating unit 34 in step S203 continue to be output until the target tilt angle θ* is achieved. When determining that the target tilt angle θ* has been achieved in step S204 (step S204: YES), the controlling device 30 advances the process to step S205.

In step S205, the controlling device 30 stops the tilt device. In step S205, the controlling device 30 causes the target position calculating unit 33*c* to generate a signal having the voltage value θv required by the control valve 41 and the cargo handling motor 43 to stop the operation of the tilt cylinders 26. The controlling device 30 outputs the signal having the voltage value θv, which has been generated in step S205, to the command value calculating unit 34, thereby stopping the tilt device. After executing step S205, the controlling device 30 advances the process to step S206.

When steps S201, S202, S203, S204, and S205 are executed, the insertion portions 231 separate from the first facing surface IH1 as indicated by the long-dash double-short-dash lines in FIG. 8, such that the distance between the first surfaces 231*a* of the insertion portions 231 and the first facing surface IH1 is greater than the specified value. The execution of steps S201, S202, S203, S204, and S205 lowers a position SP of the insertion portions 231 at an entrance IHin of the insertion opening IH by a prescribed amount Δh. The position SP, for example, refers to the position of the first surfaces 231*a* of the insertion portions 231 at the entrance IHin of the insertion opening IH. The position SP may refer to the position of the second surfaces 231*b* of the insertion portions 231 at the entrance IHin of the insertion opening IH. The position SP may refer to the position of any section of the insertion portions 231 at the entrance IHin of the insertion opening IH.

As shown in FIG. 10, the controlling device 30 calculates the target fork height PL* in step S206. Step S206 is executed by the target position calculating unit 33*c*. In step S206, the controlling device 30 calculates the target fork height PL* by adding the prescribed amount Δh to the height PL of the forks 23, which has been output by the position calculating unit 33*b*.

The prescribed amount Δh is calculated by the controlling device 30. The position of the insertion portions 231 at the execution of the stopping process is a fixed position. Also, the position of the insertion portions 231 when the tilt device is stopped in step S205 is a position that is tilted with respect to the first direction A by the angle Δθ, which is a fixed value. Thus, the prescribed amount Δh can be calculated as an amount of displacement between the position SP of the insertion portions 231 at the execution of the stopping process and the position SP when the insertion portions 231 are pivoted by the angle Δθ. After executing step S206, the controlling device 30 advances the process to step S207.

The controlling device 30 calculates a command value for operating the lift device in step S207. In the process of step S207, the controlling device 30 calculates command values for the control valve 41 and the cargo handling motor 43 that achieve the target fork height PL*, which has been calculated in the process of step S206. After executing step S207, the controlling device 30 advances the process to step S208.

In step S208, the controlling device 30 outputs signals having voltage values that achieve the command values calculated in step S207 to the control valve 41 and the cargo handling motor 43, thereby activating the lift cylinder 25. That is, the controlling device 30 lifts the forks 23 by controlling the lift device in step S208. Steps S207 and S208 are executed by the command value calculating unit 34. After executing step S208, the controlling device 30 advances the process to step S209.

In step S206, the controlling device 30 determines whether the target fork height PL*, which has been calculated in step S209, has been achieved. Step S209 is executed by the target position calculating unit 33*c*. In step S209, the controlling device 30 determines, based on the signal SL of the lift sensor 55, whether the height PL of the forks 23, which is output by the target position calculating unit 33*c*, agrees with the target fork height PL*.

When determining that the target fork height PL* has not been achieved in step S209 (step S209: NO), the controlling device 30 continues executing step S208. That is, the signals that are delivered to the control valve 41 and the cargo handling motor 43 from the command value calculating unit 34 in step S208 continue to be output until the target fork height PL* is achieved. When determining that the target fork height PL* has been achieved in step S209 (step S209: YES), the controlling device 30 advances the process to step S210.

In step S210, the controlling device 30 stops the lift device. In step S210, the controlling device 30 causes the target position calculating unit 33*c* to generate a signal having the voltage value PLAT required by the control valve 41 and the cargo handling motor 43 to stop the operation of the lift cylinder 25. The controlling device 30 outputs the signal having the voltage value PLv, which has been generated in step S210, to the command value calculating unit 34, thereby stopping the lift device. After executing step S210, the controlling device 30 ends the avoidance process and executes step S102 shown in FIG. 6 again.

The execution of steps S206, S207, S208, S209, and S210 returns the position SP of the insertion portions 231 to the position SP of the insertion portions 231 prior to the execution of the avoidance process as indicated by the long-dash double-short-dash lines in FIG. 9. The execution of steps S206, S207, S208, S209, and S210 causes the insertion portions 231 to tilt less with respect to the first facing surface IH1 and the second facing surface IH2 than prior to the execution of the avoidance process.

A situation in which the loading platform TB is inclined such that a given point on the loading platform TB separates away from the ground surface as that point separates away from the forklift 10 in the first direction A will be referred to as a second situation. Even in the second situation, an avoidance process that is similar to the avoidance process in the first situation, is executed.

The avoidance process in the second situation is a process that tilts the insertion portions 231 in the rearward direction of the forklift 10 and then lowers the insertion portions 231 in the second direction B. The angle Δθ that is used in step S201 in the avoidance process in the second situation is, for example, 1°. The fixed value is an angle that was set in advance after confirming the fact that the distance between the first surfaces 231*a* of the insertion portions 231 and the first facing surface IH1 can be greater than the specified value. The fixed value is an angle that was set in advance after confirming the fact that the distance between the second surfaces 231*b* of the insertion portions 231 and the second facing surface IH2 can be greater than the specified value. Thus, the controlling device 30 tilts the forks 23 rearward by controlling the tilt device in step S203.

When steps S201, S202, S203, S204, and S205 are executed in the avoidance process in the second situation, the insertion portions 231 separate from the second facing surface IH2, such that the distance between the insertion portions 231 and the second facing surface IH2 is greater than the specified value.

The execution of steps S201, S202, S203, S204, and S205 in the avoidance process in the second situation lifts the position SP of the insertion portions 231 by the prescribed amount Δh. Thus, the controlling device 30 lowers the forks 23 by controlling the lift device in step S208.

Even in the avoidance process in the second situation, the execution of steps S206, S207, S208, S209, and S210 returns the position SP of the insertion portions 231 to the position SP of the insertion portions 231 prior to the execution of the avoidance process. That is, the avoidance process is a process that separates the insertion portions 231 from the first facing surface IH1 or the second facing surface IH2 by controlling the tilt device and the lift device such that the position SP of the insertion portions 231 in the second direction B is not changed. In the description above, the case in which the position SP of the insertion portions 231 after the execution of the avoidance process returns to the position SP of the insertion portions 231 prior to the execution of the avoidance process is regarded as a case in which the position SP of the insertion portions 231 in the second direction B is not changed. However, the present disclosure is not limited to this. For example, a case in which the position SP of the insertion portions 231 after the execution of the avoidance process is slightly displaced from the position SP of the insertion portions 231 prior to the execution of the avoidance process may also be regarded as a case in which the position SP of the insertion portions 231 in the second direction B is not changed. That is, the case in which the position SP of the insertion portions 231 in the second direction B is not changed may refer to a case in which the position SP of the insertion portions 231 after the execution of the avoidance process is within a specified range including the position SP of the insertion portions 231 prior to the execution of the avoidance process. The specified range is set such that the insertion portions 231 does not approach the first facing surface IH1 to such an extent that the distance between the first surfaces 231*a* of the insertion portions 231 and the first facing surface IH1 is less than or equal to the specified value. Also, the specified range is set such that the insertion portions 231 does not approach the second facing surface IH2 to such an extent that the distance between the second surfaces 231*b* of the insertion portions 231 and the second facing surface IH2 is less than or equal to the specified value.

The execution of steps S206, S207, S208, S209, and S210 causes the insertion portions 231 to tilt less with respect to the first facing surface IH1 and the second facing surface IH2 than prior to the execution of the avoidance process. In the avoidance process, the target position calculating unit 33*c* continues to output to the command value calculating unit 34 the signal that has the voltage value PVv required to stop the traveling motor 15. In the avoidance process, the target position calculating unit 33*c* continues to output to the command value calculating unit 34 the signal that has the voltage value θv required by the control valve 41 and the cargo handling motor 43 to stop the operation of the reach cylinder 24. Accordingly, during the avoidance process, the mast assemblies 21 do not reach out, and the forklift 10 does not advance.

After the execution of the avoidance process, the decisions of step S102 and step S105 are NO as shown in FIG. 6. Thereafter, the decision of step S106 is YES. If the avoidance process is executed in the first situation, the decision of step S109 will be YES. If the avoidance process is executed in the second situation, the decision of step S109 will be NO.

Step S110 is executed after the execution of the avoidance process in the first situation. Step S111 is executed after the execution of the avoidance process in the second situation. In each of step S110 and step S111, the adjustment process is executed simultaneously with the insertion process.

Hereafter, the adjustment process executed in step S110 will be described with reference to FIG. 11 as an example.

Figure 11:
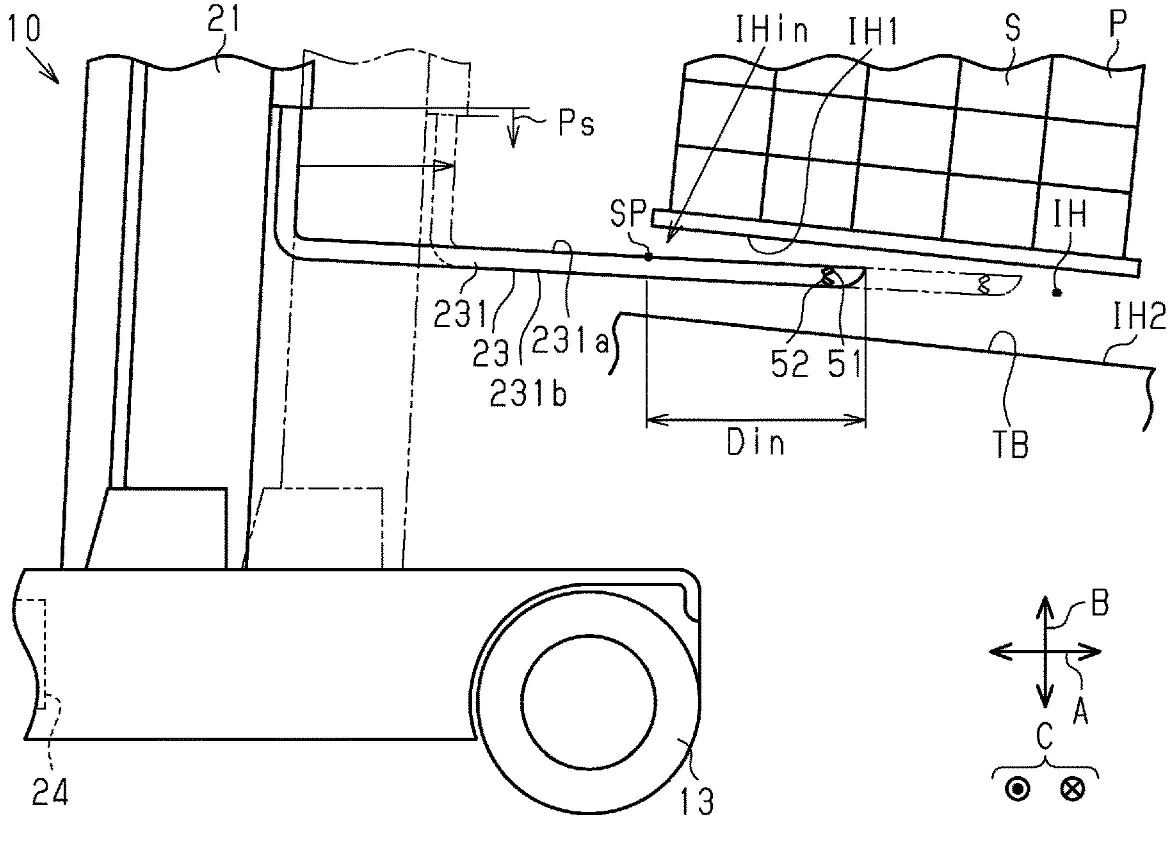
FIG. 11 is a diagram showing movement of the forks when an insertion process and an adjustment process according to the first embodiment are executed simultaneously.

As shown in FIG. 11, the adjustment process executed in step S110 is a process that lowers the forks 23 in the second direction B such that the position SP of the insertion portions 231 is not changed, while the insertion process is inserting the insertion portions 231 into the insertion opening IH. Therefore, when the insertion process and the adjustment process are executed simultaneously in step S110, the insertion portions 231 apparently move along an extension line of the insertion portions 231 prior to the execution of the adjustment process.

A speed Ps by which the forks 23 are lowered in the adjustment process executed in step S110 is set such that the position SP of the insertion portions 231 is not changed when the insertion portions 231 are inserted into the insertion opening IH. The speed Ps is determined by how fast the forks 23, which are tilted by the tilt angle θ during the execution of step S110, are moved forward with respect to the forklift 10. Therefore, the speed Ps is set based on the vehicle speed of the forklift 10, the speed by which the mast assemblies 21 reach out, and the tilt angle θ of the lift bracket 22 at the execution of step S110. In order to set the speed Ps, the storage unit 32 stores maps or expressions that represent correlation among the vehicle speed of the forklift 10, the speed by which the mast assemblies 21 reach out, the tilt angle θ of the lift bracket 22, and the speed Ps.

The target position calculating unit 33*c* compares, with the maps or the expressions, the vehicle speed of the forklift 10, which is calculated based on the movement amount PV, the reaching out speed of the mast assemblies 21, which is calculated from the movement amount Pr, and the tilt angle θ of the lift bracket 22. The target position calculating unit 33*c* sets the speed Ps based on the maps or the expressions. The target position calculating unit 33*c* calculates the target fork height PL* required to achieve the speed Ps, and outputs to the command value calculating unit 34 a signal having the voltage value PLv, which achieves the target fork height PL*. Based on the signal having the voltage value PLv, which achieves the target fork height PL*, the command value calculating unit 34 calculates command values for driving the control valve 41 and the cargo handling motor 43. The command value calculating unit 34 outputs a signal having a voltage value that corresponds to the command value to the control valve 41 and the cargo handling motor 43, thereby operating the lift cylinder 25. Step S110 is executed in this manner.

The adjustment process executed in step S111 is a process that lifts the forks 23 in the second direction B such that the position SP of the insertion portions 231 is not changed, while the insertion process is inserting the insertion portions 231 into the insertion opening IH. The adjustment process executed in step S111 is the same as an adjustment process that is executed in step S110 except that the forks 23 are lifted. Therefore, the adjustment process is a process that controls the lift device to prevent the position SP of the insertion portions 231 from being changed, while inserting the insertion portions 231 into the insertion opening IH after the avoidance process.

<Operation of Present Embodiment>

Operation of the present embodiment will now be described.

Since the avoidance process is executed after the stopping process, the insertion portions 231 can be separated from the first facing surface IH1 or the second facing surface IH2 with the moving device in a stopped state. The avoidance process controls the tilt device to tilt the insertion portions 231. As the insertion portions 231 are tilted, the insertion portions 231 separate away from the first facing surface IH1 or the second facing surface IH2, which is close to the insertion portions 231. As the insertion portions 231 are tilted, the position of the insertion portions 231 with respect to the entrance IHin of the insertion opening IH is displaced in the second direction B. However, the lift device is controlled to eliminate the displacement in the second direction B, while separating the insertion portions 231 from the first facing surface IH1 or the second facing surface IH2. That is, the insertion portions 231 can be separated from the first facing surface IH1 or the second facing surface IH2 without changing the position in the second direction B of the insertion portions 231 in relation to the entrance IHin of the insertion opening IH from the state prior to the tilting of the insertion portions 231.

<Advantages of Present Embodiment>

The present embodiment has the following advantages.

(1-1) By controlling both of the tilt device and the lift device, the insertion portions 231 can be separated from the first facing surface IH1 or the second facing surface IH2 without changing the position in the second direction B of the insertion portions 231 in relation to the entrance IHin of the insertion opening IH from the state prior to the tilting of the insertion portions 231. Thus, during the avoidance process, the insertion portions 231 is prevented from contacting the first facing surface IH1 or the second facing surface IH2 of the insertion opening IH. This allows the forks 23 to be properly inserted into the insertion opening IH, so that the pallet P is properly mounted on the forks 23.

(1-2) By executing the adjustment process while inserting the insertion portions 231 into the insertion opening IH through the insertion process, the insertion portions 231 can be inserted into the insertion opening IH while minimizing changes in the position of the insertion portions 231 relative to the insertion opening IH. Thus, during the insertion process, the insertion portions 231 are unlikely to contact the first facing surface IH1 or the second facing surface IH2 of the insertion opening IH. Accordingly, the stopping process is less frequently executed due to detection by the first sensor 51 and the second sensor 52. Since this allows insertion of the insertion portions 231 into the insertion opening IH to be continued as long as possible, the pallet P is smoothly mounted on the forks 23.

(1-3) The insertion process automatically inserts the insertion portions 231 into the insertion opening IH.

(1-4) The insertion portions 231 can be properly inserted into the insertion opening IH using only the first sensor 51 and the second sensor 52. Therefore, as compared to a forklift that requires sensors in the insertion portions 231 aside from the first sensor 51 and the second sensor 52, the forklift 10, which can mount the pallet P, is provided inexpensively.

[Second Embodiment]

A forklift 10 according to a second embodiment will now be described with reference to FIGS. 12 to 15. The main difference from the first embodiment is that a new process is added to the process flow of the controlling device 30. Those components that are the same as the corresponding components of the first embodiment will not be described.

Figure 12:
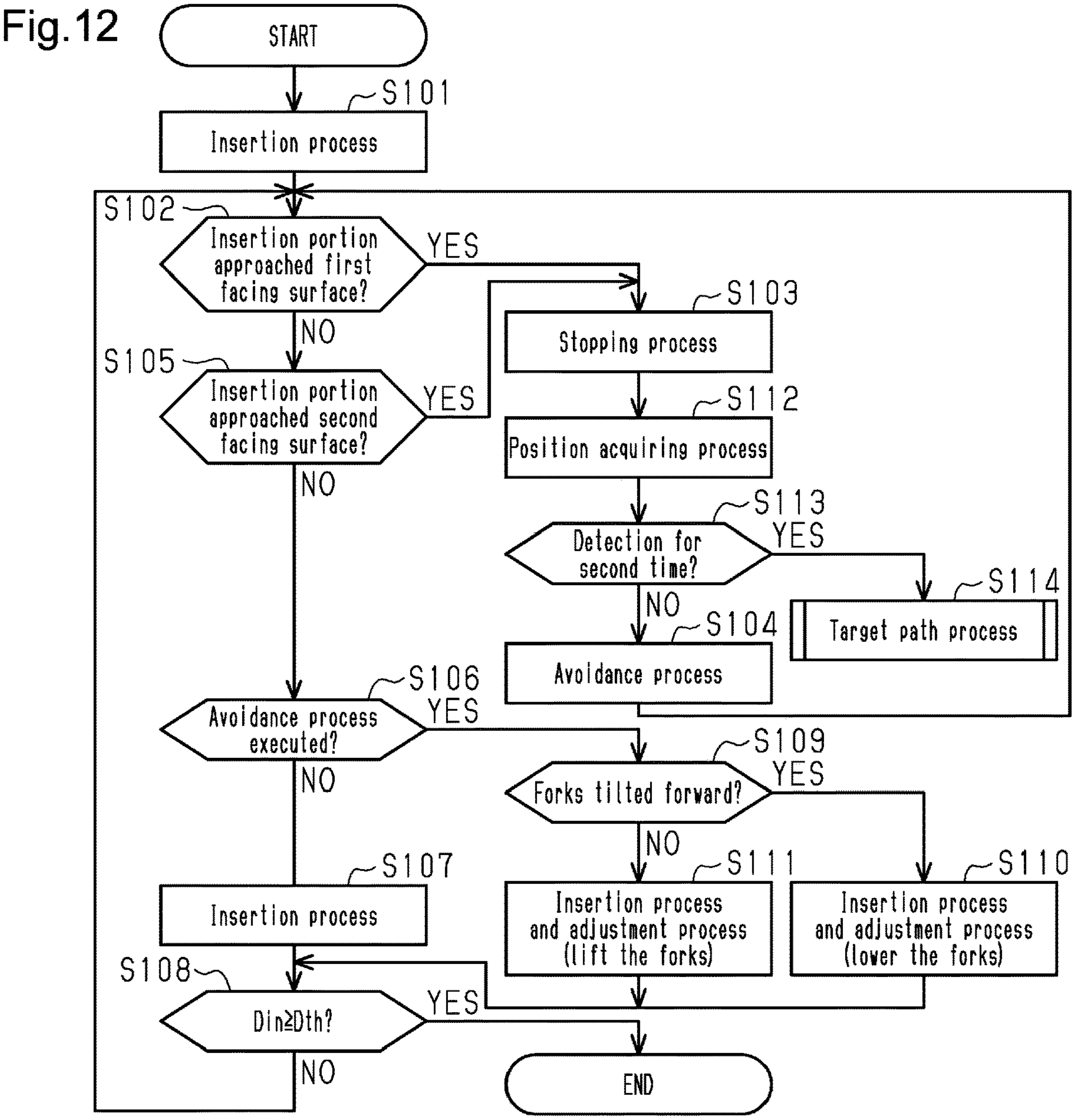
FIG. 12 is a flowchart showing a process flow executed by a controlling device of the forklift according to a second embodiment.

As shown in FIG. 12, the controlling device 30 executes step S112, step S113, and step S114 subsequent to step S103 in the process flow of the first embodiment.

When the decision of step S102 or step S105 is YES, the controlling device 30 advances the process to step S103. After executing the stopping process in step S103, the controlling device 30 advances the process to step S112.

In step S112, the controlling device 30 executes a position acquiring process. After executing step S112, the controlling device 30 advances the process to step S113.

Figure 13:
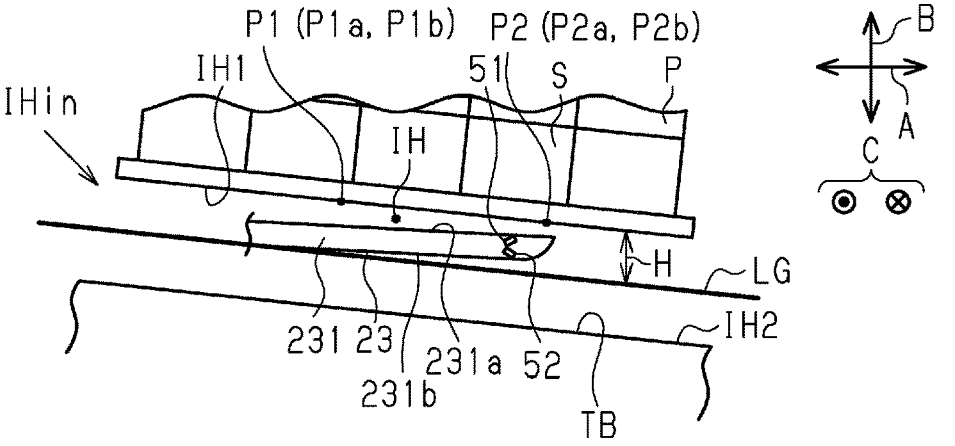
FIG. 13 is a diagram showing a position acquiring process according to the second embodiment.

With reference to FIG. 13, the position acquiring process is a process that acquires positions P1, P2 of the facing surfaces of the insertion opening IH when the first sensor 51 or the second sensor 52 detects the proximity state. In the present embodiment, the position P1 of a facing surface of the insertion opening IH is the position of the first facing surface IH1 when the first sensor 51 or the second sensor 52 detects the proximity state for the first time. The position P1 of the first facing surface IH1 is expressed by a coordinate. The position P1 of the first facing surface IH1 is expressed by a first point P1*a*, which is the position in the first direction A of the first facing surface IH1, and a second point P1*b*, which is the position in the second direction B of the first facing surface IH1. The position P1 of the first facing surface IH1 is, for example, a position when the decision of step S102 is YES before the execution of the avoidance process of the first embodiment.

In the present embodiment, the position P2 of a facing surface of the insertion opening IH is the position of the first facing surface IH1 when the first sensor 51 or the second sensor 52 detects the proximity state for the second time. The position P2 of the first facing surface IH1 is expressed by a coordinate. The position P2 of the first facing surface IH1 is expressed by a third point P2*a*, which is the position of the first facing surface IH1 in the first direction A, and a fourth point P2*b*, which is the position of the first facing surface IH1 in the second direction B. The position P2 of the first facing surface IH1 is, for example, a position of the first facing surface IH1 when the decision of step S102 is YES again during the execution of the insertion process and the adjustment process in step S110 of the first embodiment.

The first point P1*a* and the third point P2*a* are examples of a first position of the first facing surface IH1 in the first direction A. The second point P1*b* and the fourth point P2*b* are examples of a second position of the first facing surface IH1 in the second direction B. The first point P1*a* is an example of a first-time first position, which is the first position when the first sensor 51 or the second sensor 52 detects the proximity state for the first time. The second point P1*b* is an example of a first-time second position, which is the second position when the first sensor 51 or the second sensor 52 detects the proximity state for the first time. The third point P2*a* is an example of a second-time first position, which is the first position when the first sensor 51 or the second sensor 52 detects the proximity state for the second time. The fourth point P2*b* is an example of a second-time second position, which is the second position when the first sensor 51 or the second sensor 52 detects the proximity state for the second time.

The first point P1*a* and the third point P2*a* are each expressed as a sum of the movement amount PV of the forklift 10 and the movement amount Pr of the reached-out mast assemblies 21. The second point P1*b* and the fourth point P2*b* are each expressed as the height PL of the forks 23. For illustrative purposes, FIG. 13 only illustrates an insertion portion 231 of a fork 23 and the insertion opening IH without showing the whole forklift 10. When the facing surface to which the fork 23 is close is the second facing surface IH2, the positions P1, P2 of the facing surface of the insertion opening IH are the positions of the second facing surface IH2.

As shown in FIG. 12, the controlling device 30 determines, in step S113, whether the first sensor 51 or the second sensor 52 has detected the proximity state for the second time. Step S113 is executed by the proximity detecting unit 33*a*. The proximity detecting unit 33*a* includes a counter that counts the numbers of times the respective signals 51, S2 are input. When the number counted by the counter becomes 2, the proximity detecting unit 33*a* determines that the first sensor 51 or the second sensor 52 has detected the proximity state for the second time.

If it is determined in step S113 that the first sensor 51 or the second sensor 52 has detected the proximity state not for the second time (step S113: NO), the controlling device 30 advances the process to step S104. If it is determined in step S113 that the first sensor 51 or the second sensor 52 has detected the proximity state for the second time (step S113: YES), the controlling device 30 advances the process to step S114. The controlling device 30 executes a target path process in step S114. The target path process will now be described.

Figure 14:
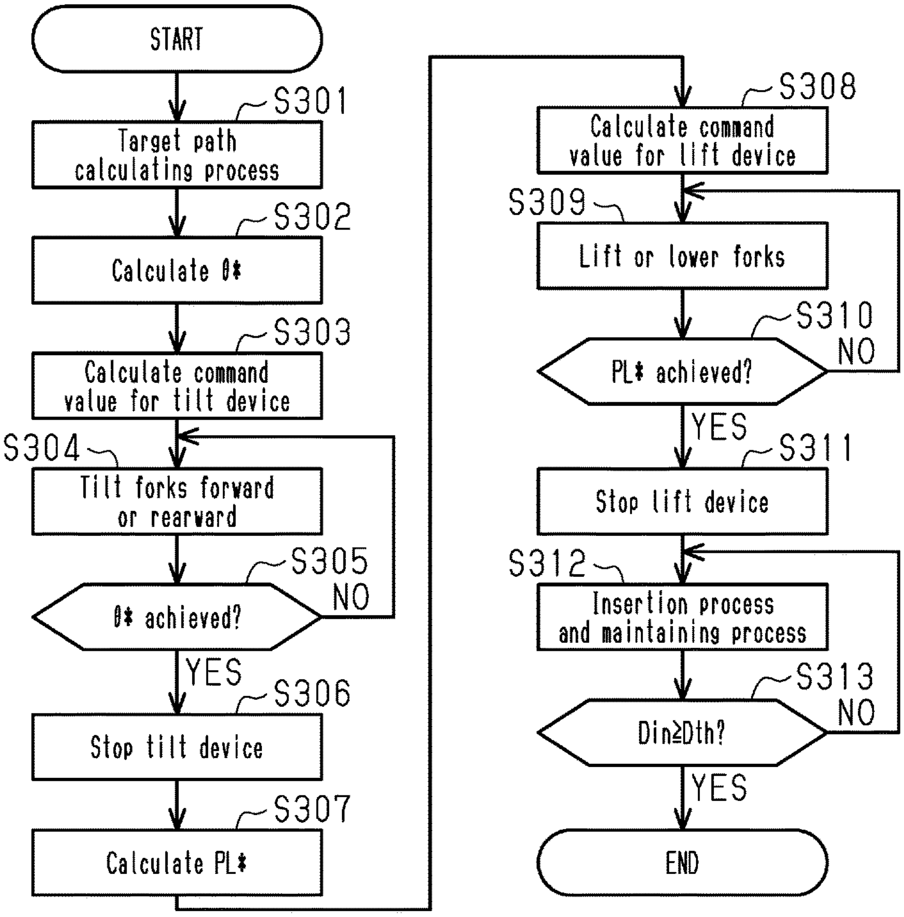
FIG. 14 is a diagram showing a process flow of a target path process according to the second embodiment.

As shown in FIG. 14, the controlling device 30 first executes step S301 in the target path process. The controlling device 30 executes a target path calculating process in step S301. The target path calculating process is a process that is executed after the stopping process is executed at the second-time detection of the proximity state by the first sensor 51 or the second sensor 52. The target path calculating process is a process that sets a target path LG. After executing step S301, the controlling device 30 advances the process to step S302.

In the target path calculating process, the controlling device 30 sets the target path LG based on the positions P1, P2 of the first facing surface IH1, which have been acquired in the position acquiring process, as shown in FIG. 13. The controlling device 30 obtains, as an inclination of the first facing surface IH1 and the second facing surface IH2, a value obtained by dividing the difference between the second point P1*b* and the fourth point P2*b* by the difference between the first point P1*a* and the third point P2*a*. The controlling device 30 displaces an imaginary straight line having the obtained inclination from the first facing surface IH1 by a specified amount H and uses the displaced imaginary straight line as the target path LG.

The specified amount H is set such that the target path LG does not approach the first facing surface IH1 to such an extent that the distance between the target path LG and the first facing surface IH1 is less than or equal to the specified value. The specified amount H is set such that the target path LG does not approach the second facing surface IH2 to such an extent that the distance between the target path LG and the second facing surface IH2 is less than or equal to the specified value.

As shown in FIG. 14, the controlling device 30 calculates the target tilt angle θ* in step S302. Step S302 is executed by the target position calculating unit 33*c*. The controlling device 30 calculates the target tilt angle θ* from the inclination of the target path LG in step S302. After executing step S302, the controlling device 30 advances the process to step S303.

The controlling device 30 calculates a command value for operating the tilt device in step S303. In step S303, the controlling device 30 calculates command values for the control valve 41 and the cargo handling motor 43 that achieve the target tilt angle θ*, which has been calculated in step S302. After executing step S303, the controlling device 30 advances the process to step S304.

In step S304, the controlling device 30 outputs signals having voltage values that achieve the command values calculated in step S303 to the control valve 41 and the cargo handling motor 43, thereby activating the tilt cylinder 26. That is, the controlling device 30 tilts the forks 23 forward or rearward by controlling the tilt device in step S304. Steps S303 and S304 are executed by the command value calculating unit 34. After executing step S304, the controlling device 30 advances the process to step S305.

In step S305, the controlling device 30 determines whether the target tilt angle θ*, which has been calculated in step S302, has been achieved. Step S305 is executed by the target position calculating unit 33*c*. In step S305, the controlling device 30 determines whether the tilt angle θ, which has been output by the position calculating unit 33*b* based on the signal Sθ of the tilt sensor 56, agrees with the target tilt angle θ*. When determining that the target tilt angle θ* has not been achieved in step S305 (step S305: NO), the controlling device 30 continues executing the process to step S304. That is, the signals that are delivered to the control valve 41 and the cargo handling motor 43 from the command value calculating unit 34 in step S304 continue to be output until the target tilt angle θ* is achieved. When determining that the target tilt angle θ* has been achieved in step S305 (step S305: YES), the controlling device 30 advances the process to step S306.

In step S306, the controlling device 30 stops the tilt device. In step S306, the controlling device 30 causes the target position calculating unit 33*c* to generate a signal having the voltage value θv required by the control valve 41 and the cargo handling motor 43 to stop the operation of the tilt cylinders 26. The controlling device 30 outputs the signal having the voltage value θv, which has been generated in step S306, to the command value calculating unit 34, thereby stopping the tilt device. After executing step S306, the controlling device 30 advances the process to step S307.

The controlling device 30 calculates the target fork height PL* in step S307. Step S307 is executed by the target position calculating unit 33*c*. The controlling device 30 calculates the target fork height PL* from the specified amount H of the target path LG in step S307. After executing step S307, the controlling device 30 advances the process to step S308.

The controlling device 30 calculates a command value for operating the lift device in step S308. In step S308, the controlling device 30 calculates command values for the control valve 41 and the cargo handling motor 43 that achieve the target fork height PL*, which has been calculated in step S307. After executing step S308, the controlling device 30 advances the process to step S309.

In step S309, the controlling device 30 outputs signals having voltage values that achieve the command values calculated in step S308 to the control valve 41 and the cargo handling motor 43, thereby activating the lift cylinder 25. That is, the controlling device 30 lifts or lowers the forks 23 by controlling the lift device in step S309. Steps S308 and S309 are executed by the command value calculating unit 34. After executing step S309, the controlling device 30 advances the process to step S310.

In step S310, the controlling device 30 determines whether the target fork height PL*, which has been calculated in step S307, has been achieved. Step S310 is executed by the target position calculating unit 33*c*. In step S310, the controlling device 30 determines, based on the signal SL of the lift sensor 55, whether the height PL of the forks 23, which is output by the target position calculating unit 33*c*, agrees with the target fork height PL*.

When determining that the target fork height PL* has not been achieved in step S310 (step S310: NO), the controlling device 30 continues executing step S309. That is, the signals that are delivered to the control valve 41 and the cargo handling motor 43 from the command value calculating unit 34 in step S309 continue to be output until the target fork height PL* is achieved. When determining that the target fork height PL* has been achieved in step S310 (step S310: YES), the controlling device 30 advances the process to step S311.

In step S311, the controlling device 30 stops the lift device. In step S311, the controlling device 30 causes the target position calculating unit 33*c* to generate a signal having the voltage value PLv required by the control valve 41 and the cargo handling motor 43 to stop the operation of the lift cylinder 25. The controlling device 30 outputs the signal having the voltage value PLv, which has been generated in step S311, to the command value calculating unit 34, thereby stopping the lift device. After executing step S311, the controlling device 30 advances the process to step S312.

In step S312, the controlling device 30 simultaneously executes the insertion process and the maintaining process. After executing step S312, the controlling device 30 advances the process to step 313. Step S313 is the same as step S108. When the decision of step S313 is NO, the controlling device 30 continues executing step S312. When the decision of step S313 is YES, the controlling device 30 ends all the processes for inserting the insertion portions 231 into the insertion opening IH.

Figure 15:
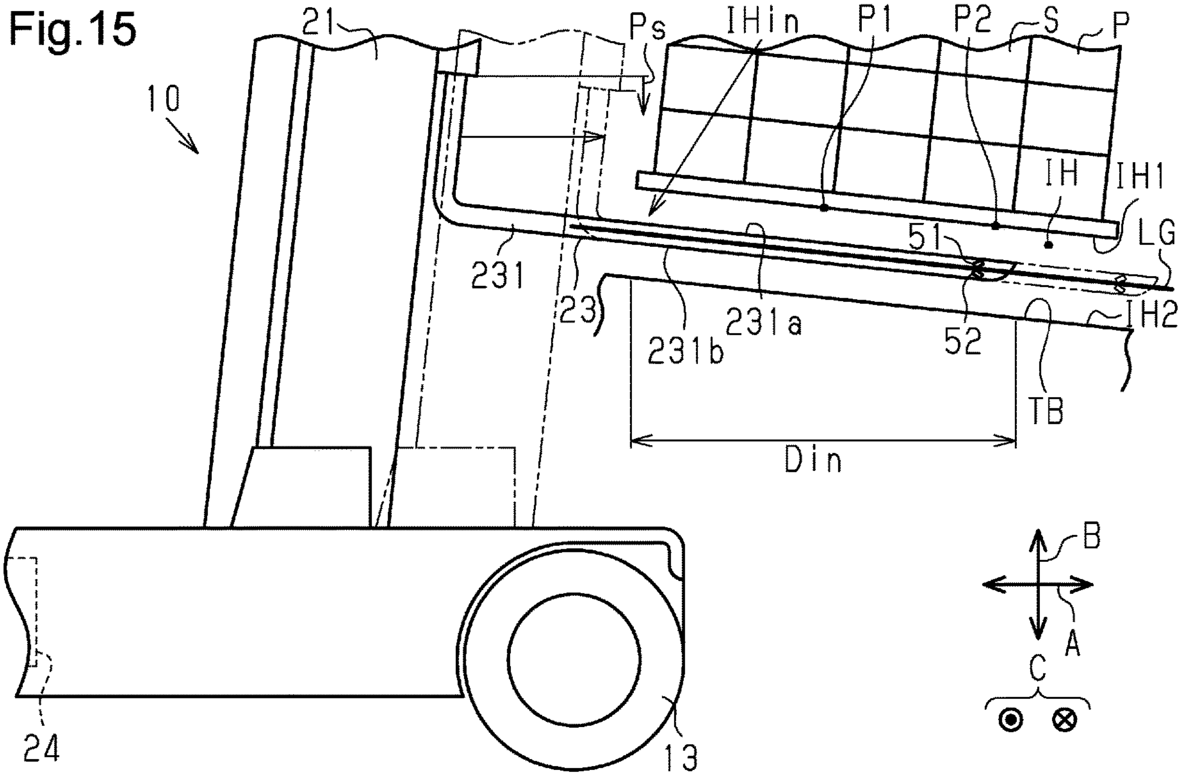
FIG. 15 is a diagram showing movement of the forks when a maintaining process according to the second embodiment is executed.

When steps S301 to S311 are executed, the insertion portions 231 are located on the target path LG as shown in FIG. 15. The execution of steps S301 to S311 causes the insertion portions 231 to extend parallel to the first facing surface IH1 and the second facing surface IH2. The avoidance process of the first embodiment is a first-time avoidance process, which is executed at the first-time detection of the proximity state by the first sensor 51 or the second sensor 52. Steps S302 to S311 are executed after the target path calculating process and correspond to a second avoidance process, which puts the insertion portions 231 on the target path LG by controlling the lift device and the tilt device.

The maintaining process is a process that controls the lift device so as to maintain the insertion portions 231 on the target path LG, while executing the insertion process after the second avoidance process to insert the insertion portions 231 into the insertion opening IH. The maintaining process is basically the same as the adjustment process, which is executed in step S110 and step S111. The maintaining process is slightly different from the adjustment process in that the way in which the speed Ps is set. The speed Ps is set in the maintaining process such that a given position of the insertion portions 231 on the target path LG does not change relative to the entrance IHin of the insertion opening IH.

<Operation of Present Embodiment>

Operation of the present embodiment will now be described.

The insertion portions 231 are inserted into the insertion opening IH along the target path LG after the second-time detection of the proximity state by the first sensor 51 or the second sensor 52 is confirmed. Thus, after the second-time detection of the proximity state by the first sensor 51 or the second sensor 52, the stopping process is not executed.

<Advantages of Present Embodiment>

The present embodiment has the following advantages.

(2-1) The controlling device 30 executes the target path calculating process, the second avoidance process, and the maintaining process, thereby inserting the insertion portions 231 into the insertion opening IH along the target path LG. Since the insertion of the insertion portions 231 into the insertion opening IH is not stopped by the stopping process, the insertion of the insertion portions 231 into the insertion opening IH is optimized.

(2-2) The number of times the insertion portions 231 are inserted into the insertion opening IH to such an extent that the inserted amount Din of the insertion portions 231 into the insertion opening IH is greater than or equal to the prescribed value Dth is limited to two at a maximum. This reduces the time required to mount the pallet on the forks 23.

<Modifications>

The above-described embodiments may be modified as follows. The above-described embodiments and the following modifications can be combined as long as the combined modifications remain technically consistent with each other.

Although the forklift 10 that is not operated by an operator has been described, the forklift 10 may be operated by an operator.

For example, all the processes for inserting the insertion portions 231 into the insertion opening IH may be ended through operation of the manipulation portion 16 by the operator without executing step S108 or step S313.

For example, the embodiments may be modified such that the insertion portions 231 are inserted into the insertion opening IH through operation of the manipulation portion 16 by the operator without the insertion process by the controlling device 30. Even with this modification, the moving device, the lift device, and the tilt device are stopped when the stopping process is executed, irrespective of operation of the manipulation portion 16 by the operator. The avoidance process after the stopping process is also executed irrespective of operation of the manipulation portion 16 by the operator if the stopping process is executed.

The conditions for setting the specified amount H may include a condition that the position SP of the insertion portions 231 in the second direction B relative to the entrance IHin of the insertion opening IH at the execution of a second-time stopping process does not change.

The specified amount H may be set, for example, in the following manner. The lift device is controlled to vertically move the insertion portions 231 in the second direction B until the first sensor 51 and the second sensor 52 respond.

The specified amount H may be set to a half of the moved amount of the insertion portions 231 in the second direction B.

The specified amount H may be set, for example, in the following manner. The lift device is controlled to vertically move the insertion portions 231 in the second direction B until the insertion portions 231 contact the first facing surface IH1 or the second facing surface IH2. The specified amount H may be set to a half of the moved amount of the insertion portions 231 in the second direction B.

If the size of the insertion opening IH is known in advance, the specified amount H may be set to the distance between the center line of the insertion opening IH and each facing surface of the insertion opening IH.

The specified amount H may be changed as long as the target path LG is not located on the first facing surface IH1 or the second facing surface IH2.

In the avoidance process, the lift device is controlled after the tilt device is controlled. However, the present disclosure is not limited to this. The controlling device 30 may control the tilt device and the lift device simultaneously as long as it is possible to prevent the position SP of the insertion portions 231 in the second direction B from being changed in relation to the entrance IHin of the insertion opening IH. Even with this modification, as in the first embodiment, the case in which the position SP of the insertion portions 231 in the second direction B is not changed may refer to a case in which the position SP of the insertion portions 231 after the execution of the avoidance process is within a specified range including the position SP of the insertion portions 231 prior to the execution of the avoidance process.

The insertion opening IH may be a hole formed in the pallet P. In this case, the surfaces that define the insertion opening IH include a surface that faces the first surfaces 231*a* of the insertion portions 231, and that surface is the first facing surface IH1. The surfaces that define the insertion opening IH also include a surface that faces the second surfaces 231*b* of the insertion portions 231, and that surface is the second facing surface IH2.

Although the above-described embodiments use a reach forklift, a counterbalance forklift may be used if that forklift includes a tilt device, a lift device, and a moving device. If a counterbalance forklift is used, the controlling device 30 calculates the inserted amount Din based on the tilt angle θ of the lift bracket 22 and the movement amount PV of the forklift 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A forklift, comprising:

a vehicle body;

a fork configured to mount a pallet, an opening into which the fork is inserted when the pallet is mounted on the fork being an insertion opening, the fork including an insertion portion that is inserted into the insertion opening, a surface that defines the insertion opening including a facing surface that faces the insertion portion in a thickness direction of the insertion portion;

a moving device that is configured to move the fork in a first direction, the first direction being a front-rear direction of the vehicle body;

a lift device that is configured to lift or lower the fork in a second direction, the second direction being orthogonal to the first direction and being an up-down direction of the vehicle body;

a tilt device that is configured to tilt the fork with respect to the first direction;

a sensor that is provided in the insertion portion and is configured to detect a proximity state, in which the insertion portion has approached the facing surface to such an extent that a distance between the insertion portion and the facing surface is less than or equal to a specified value; and processing circuitry that is configured to control the moving device, the lift device, and the tilt device, wherein the processing circuitry is configured to execute:

a stopping process that stops the moving device, the lift device, and the tilt device when the sensor detects the proximity state; and an avoidance process that controls, after the stopping process, the tilt device and the lift device to separate the insertion portion away from the facing surface such that a position in the second direction of the insertion portion with respect to an entrance of the insertion opening does not change.

2. The forklift according to claim 1, wherein the processing circuitry is configured to execute an adjustment process that controls, while inserting the insertion portion into the insertion opening after the avoidance process, the lift device such that the position of the insertion portion with respect to the entrance of the insertion opening does not change.

3. The forklift according to claim 1, wherein the avoidance process is a first-time avoidance process that is executed when the sensor detects the proximity state for the first time, a position in the first direction of the facing surface is a first position, and a position in the second direction of the facing surface is a second position, the first position when the sensor detects the proximity state for the first time is a first-time first position, the second position when the sensor detects the proximity state for the first time is a first-time second position, the first position when the sensor detects the proximity state for the second time is a second-time first position, the second position when the sensor detects the proximity state for the second time is a second-time second position, a value obtained by dividing a difference between the first-time second position and the second-time second position by a difference between the first-time first position and the second-time first position is an inclination of the facing surface, an imaginary straight line that has the inclination of the facing surface is a target path, the imaginary straight line being displaced from the facing surface by a specified amount such that the imaginary straight line and the facing surface does not approach each other to such an extent that a distance between the imaginary straight line and the facing surface is less than or equal to a specified value, and the processing circuitry is configured to execute:

a position acquiring process that acquires the first position and the second position when the sensor detects the proximity state;

a target path calculating process that calculates the target path after the stopping process that is executed when the sensor has detected the proximity state for the second time;

a second avoidance process that controls, after the target path calculating process, the lift device and the tilt device thereby arranging the insertion portion on the target path; and a maintaining process that controls the lift device so as to maintain the insertion portion on the target path, while inserting the insertion portion into the insertion opening after the second avoidance process.

4. The forklift according to claim 1, wherein the processing circuitry is configured to execute an insertion process that controls the moving device to insert the insertion portion into the insertion opening.

5. The forklift according to claim 1, wherein the processing circuitry is configured to end all the processes for inserting the insertion portion into the insertion opening when an inserted amount of the insertion portions into the insertion opening is greater than or equal to a prescribed value.

6. A control method for a forklift, the forklift including a vehicle body and a fork configured to mount a pallet, wherein an opening into which the fork is inserted when the pallet is mounted on the fork is an insertion opening, the fork including an insertion portion that is inserted into the insertion opening, a surface that defines the insertion opening including a facing surface that faces the insertion portion in a thickness direction of the insertion portion, and the control method comprises:

inserting the insertion portion into the insertion opening, while moving the fork;

using a sensor that is provided in the insertion portion to detect a proximity state, in which the insertion portion has approached the facing surface to such an extent that a distance between the insertion portion and the facing surface is less than or equal to a specified value;

executing a stopping process that stops movement of the fork when the sensor detects the proximity state; and executing an avoidance process that tilts and vertically moves, after the stopping process, the fork to separate the insertion portion away from the facing surface such that a position of the insertion portion with respect to an entrance of the insertion opening does not change in an up-down direction of the vehicle body.

* * * * *